(12) United States Patent
Kobilarov et al.

(10) Patent No.: US 12,391,246 B2
(45) Date of Patent: Aug. 19, 2025

(54) TRAJECTORY OPTIMIZATION IN MULTI-AGENT ENVIRONMENTS

(71) Applicant: Zoox, Inc., Foster City, CA (US)

(72) Inventors: Marin Kobilarov, Baltimore, MD (US); Chonhyon Park, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 339 days.

(21) Appl. No.: 17/900,258

(22) Filed: Aug. 31, 2022

(65) Prior Publication Data

US 2024/0092357 A1 Mar. 21, 2024

(51) Int. Cl.
 *B60W 30/095* (2012.01)
(52) U.S. Cl.
 CPC ..... *B60W 30/0956* (2013.01); *B60W 2555/60* (2020.02)
(58) Field of Classification Search
 CPC ............ B60W 30/0956; B60W 2555/60
 See application file for complete search history.

(56) References Cited

U.S. PATENT DOCUMENTS

| 10,474,953 | B2 * | 11/2019 | Thompson | G06N 3/126 |
|---|---|---|---|---|
| 11,999,380 | B1 * | 6/2024 | Funke | B60W 60/0011 |
| 2017/0277195 | A1 | 9/2017 | Frazzoli et al. | |
| 2019/0009133 | A1 * | 1/2019 | Mettler May | G09B 19/0038 |
| 2020/0225669 | A1 * | 7/2020 | Silva | G01S 17/06 |
| 2020/0341476 | A1 * | 10/2020 | Wuthishuwong | G08G 1/167 |
| 2020/0361083 | A1 * | 11/2020 | Mousavian | G06N 3/063 |
| 2020/0363806 | A1 * | 11/2020 | Kobilarov | G06V 20/56 |
| 2021/0223391 | A1 * | 7/2021 | Drysch | G08G 1/0129 |
| 2021/0271245 | A1 * | 9/2021 | Bradley | G05D 1/227 |
| 2021/0334630 | A1 * | 10/2021 | Lambert | G06N 3/047 |

(Continued)

FOREIGN PATENT DOCUMENTS

| CN | 113624235 A | 11/2021 |
|---|---|---|
| KR | 20160088638 A | 7/2016 |

OTHER PUBLICATIONS

PCT Search Report and Written Opinion mailed Dec. 8, 2023 for PCT Application No. PCT/US2023/030333, 12 pages.

*Primary Examiner* — Hunter B Lonsberry
*Assistant Examiner* — Jalal C Coduroglu
(74) *Attorney, Agent, or Firm* — Lee & Hayes, P.C.

(57) ABSTRACT

Techniques are discussed herein for determining optimal driving trajectories for autonomous vehicles in complex multi-agent driving environments. A baseline trajectory may be perturbed and parameterized into a vector of vehicle states associated with different segments (or portions) of the trajectory. Such a vector may be modified to ensure the resultant perturbed trajectory is kino-dynamically feasible. The vectorized perturbed trajectory may be input, including a representation of the current driving environment and additional agents, into a prediction model trained to output a predicted future driving scene. The predicted future driving scene, including predicted future states for the vehicle and predicted trajectories for the additional agents in the environment, may be evaluated to determine costs associated with each perturbed trajectory. Based on the determined costs, the optimization algorithm may determine subsequent perturbations and/or the optimal trajectory for controlling the vehicle in the driving environment.

20 Claims, 13 Drawing Sheets

(56) References Cited

U.S. PATENT DOCUMENTS

| | | | |
|---|---|---|---|
| 2021/0380142 A1* | 12/2021 | Ramamoorthy | G06V 20/54 |
| 2022/0080585 A1* | 3/2022 | Nishimura | G05D 1/0214 |
| 2022/0101112 A1* | 3/2022 | Brown | G10L 15/18 |
| 2022/0126864 A1* | 4/2022 | Moustafa | G06T 1/0007 |
| 2022/0152826 A1* | 5/2022 | Danielczuk | G06V 10/82 |
| 2022/0153298 A1* | 5/2022 | Wang | G06N 3/126 |

* cited by examiner

TRAJECTORY COST TABLE

| PERTURBED TRAJECTORY | CONFIDENCE | ROUTE PROGRESS | POTENTIAL INTERSECTION | PASSENGER COMFORT | CENTER-LANE ABIDANCE | ... | AGGREGATED COST |
|---|---|---|---|---|---|---|---|
| 1 | 63.3% | 1.1 | 1.8 | 3.1 | 1.2 | ... | 8.6 |
| 1 | 14.% | 3.2 | 3.2 | 1.8 | 2.5 | ... | 8.9 |
| 2 | 77.8% | 6.1 | 15.8 | 4.2 | 1.6 | ... | 32.2 |
| 2 | 10.2% | 5.2 | 2.1 | 3.1 | 3.1 | ... | 25.7 |
| 2 | 8.5% | 4.9 | 4.1 | 1.8 | 0.8 | ... | 22.8 |
| 3 | 49.3% | 10.3 | 3.7 | 6.2 | 1.0 | ... | 14.8 |

FIG. 5

TRAJECTORY OPTIMIZATION IN MULTI-AGENT ENVIRONMENTS

BACKGROUND

Autonomous driving may benefit from computing systems capable of determining driving paths and navigating along routes from an initial location toward a destination. For example, autonomous and semi-autonomous vehicles may utilize systems and components to traverse through driving environments including other objects, such as moving or stationary vehicles (autonomous or otherwise), pedestrians, buildings, etc. When traversing through such an environment, the vehicle may determine a trajectory based on sensor data from the perception systems of the vehicle, as well as map data of the environment. For example, a planning system within an autonomous or semi-autonomous vehicle may determine a trajectory and a corresponding set of actions for the vehicle to take to navigate in an operating environment. Trajectory selection techniques may take into account considerations such as kinematic and/or dynamic (kino-dynamic) feasibility of the vehicle, passenger safety and comfort, driving efficiency, route continuity, and the like. Additionally, the trajectory and actions for a vehicle may be determined based in part on avoiding other objects present in the environment. For example, an action may be generated by a planning system to yield to a pedestrian, to change a lane to avoid another vehicle in the road, etc. The perception systems of the vehicle utilize sensor data to perceive the environment, which also enables the planning system to determine an effect of a detected object on the potential actions for the vehicle. However, the complexity of such environments may preclude efficient determination of optimized trajectories for the vehicle, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example trajectory cost table for a number of perturbed trajectories associated with an autonomous vehicle, in accordance with one or more examples of the disclosure.

DETAILED DESCRIPTION

Figure 1:
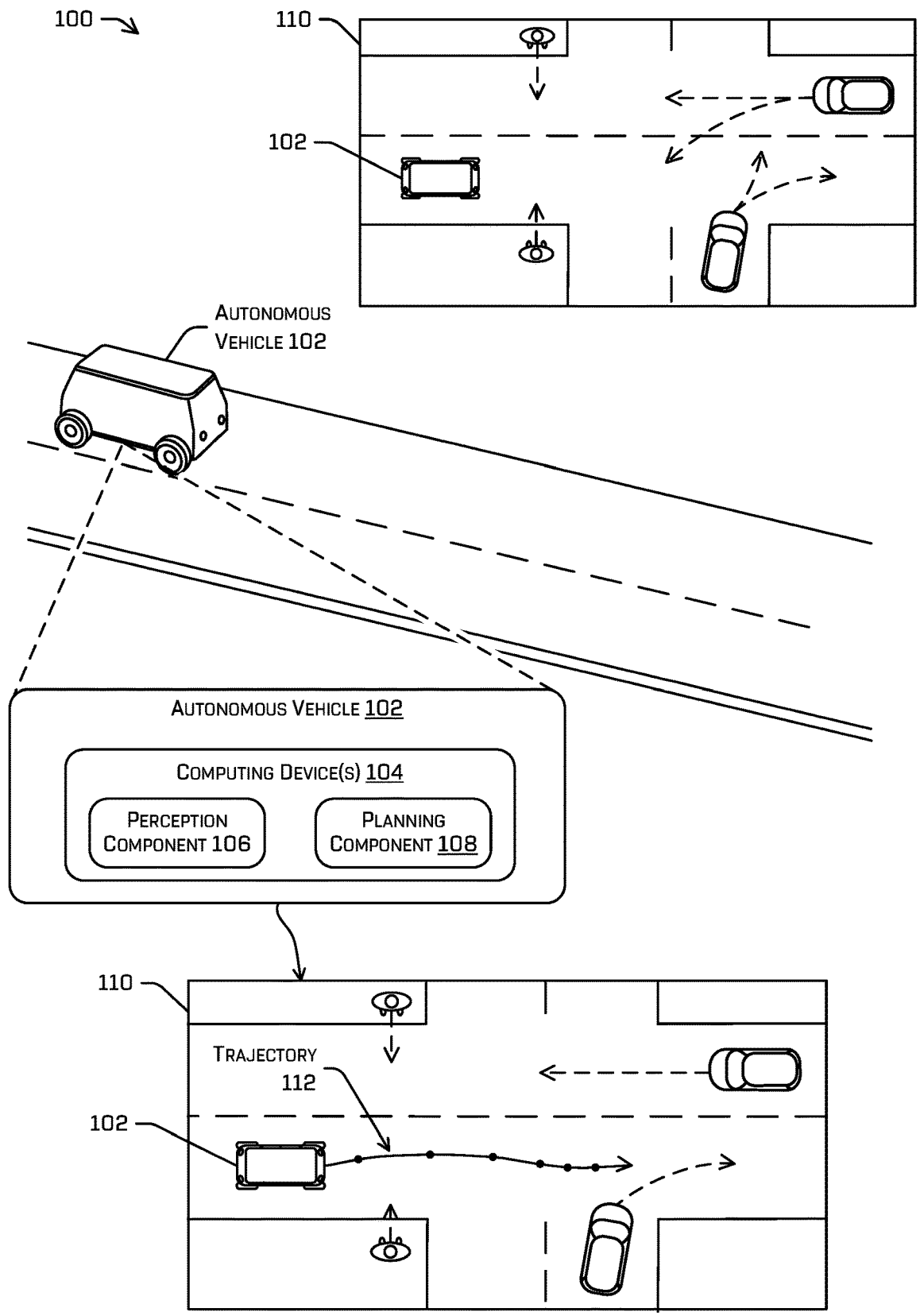
FIG. 1 illustrates an autonomous vehicle and an example scenario in which a driving trajectory is determined to control the autonomous vehicle along a route in an environment.

This application relates to determining driving trajectories for autonomous vehicles between various states (and/or positions) in a driving environment. In some examples, the techniques described herein may use optimization algorithms, such as stochastic optimization, to determine optimal trajectories for autonomous vehicles in complex multi-agent environments. A baseline trajectory for an autonomous vehicle may be perturbed using an optimization algorithm, and the perturbed trajectory may be parameterized into a vector of vehicle states associated with different segments (or portions) of the trajectory. The vector representing the perturbed trajectory, as well as data representing the current driving environment and additional agents within the environment, may be used as inputs to a machine-learned (ML) prediction model trained to output predicted future driving scenes. In some examples, the prediction model may include an active prediction ML model configured to output a sequence of predicted future driving scenes over the period of time of the perturbed trajectory, including predicted future states for the autonomous vehicle and predicted trajectories for the additional agents in the environment (which may, in such examples, respond to the various actions of the autonomous vehicle). A cost evaluator may be used to analyze the predicted future driving scenes to determine and aggregate various heuristic costs associated with each perturbed trajectory. Based on the determined costs, the optimization algorithm may determine subsequent perturbations and/or an optimal (e.g., lowest-cost) control trajectory from the various perturbed trajectories, which may be selected to control the vehicle in the driving environment.

As illustrated below, the various examples and techniques described herein may be implemented in a number of ways to improve the operation of autonomous vehicles and the functioning of computing systems. For example, these techniques may improve the functioning, safety, and efficiency of autonomous and semi-autonomous vehicles operating in real-world driving environments, by determining improved driving trajectories (and/or driving paths) through the environments, taking into account passenger and vehicle safety, driving efficiency, kino-dynamic feasibility of the vehicle, and various other cost-based metrics.

Various examples described herein may include determining trajectories and/or driving paths for autonomous vehicles to follow when traversing a driving environment. A trajectory and/or a driving path may correspond to a route including a starting position (e.g., a start state) and an end position (e.g., an end state), through which the vehicle may traverse. For a particular driving route, there are any number of possible trajectories and/or paths that the vehicle may take to traverse from the start state to the end state, including different positions, steering angles, velocities, and/or accelerations at the different intermediate points along the route. In some examples, a driving route may pass through a portion of a single lane and/or roadway, which can be straight or can include any number of curves or obstacles around which the vehicle may navigate from the start state to the end state. In other examples, driving routes may pass through more complex environments and/or include more complex driving maneuvers, such as lane changes, merging lanes, junctions, intersections, and the like, through which the vehicle may navigate between the start state and the end state.

As used in these examples, a "path" may refer to a sequence of spatial (e.g., geometric) states, in which each spatial state corresponds to a point or position in the path, and each spatial state includes a combination of geometric data such as an x-position, y-position, yaw, and/or steering angle, etc. In contrast, in such examples, a "trajectory" may refer to a sequence of spatiotemporal states rather than geometric states. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc.

Similarly, in various examples described herein, trajectories and/or driving paths may be determined as sequences of positions (or points), or as sequences of states. As used in such examples, a "position" (or "point") may refer to a geometric (or spatial) state including position data (e.g., x-position, y-position, yaw, steering angle, etc.). In contrast, in such examples, a "state" may refer to a combination of a geometric state and/or a temporal state, which may include x-position, y-position, yaw, yaw rate, steering angle, steering angle rate, velocity, and/or acceleration, etc. In practice, a vehicle may be controlled to implement numerous trajectories and/or driving paths, and to pass through numerous individual pointes, positions, and/or states while navigating along the route from the starting position (e.g., start state) to the end position (e.g., end state).

Existing techniques for optimizing trajectories of autonomous vehicles and other robotic systems may include using smoothing algorithms, tree search algorithms, and/or optimization algorithms, during which costs are minimized based on preferred driving policies related to driving path efficiency, safety, passenger comfort, etc. Tree search algorithms, for example, may be easy to implement and may execute relatively quickly on a vehicle in runtime to select a minimum cost vehicle trajectory. However, tree search techniques may identify a local minima rather than the global minimum within the search space, and thus may determine suboptimal trajectories in non-smooth search spaces. Additionally, tree search techniques may perform vehicle-centric optimizations in which an optimal trajectory is determined based on vehicle-specific costs (e.g., path efficiency, lane adherence, and passenger comfort, etc.) that do not take into account costs based on interactions with other agents. Tree search techniques may fail to incorporate costs based on predicted agent trajectories, including costs based on potential collisions or near-miss collisions, failure to yield and/or aggressive driving costs relative to other vehicles, pedestrians, bicycles, etc. As a result, tree search techniques may output techniques that are suboptimal and/or potentially unsafe for the vehicle to follow to traverse the environment.

In contrast to tree search techniques, a number of optimization algorithms may provide fully optimized solutions regardless of the complexity of the search space. Thus, some optimization techniques may solve the full optimization problem, even in complex and/or multi-agent driving environments. However, such optimization techniques may be slow and computationally expensive, making it difficult or practically impossible to use such techniques to determine an optimal trajectory for a vehicle in a real-time driving environment.

To address the technical challenges of vehicle trajectory optimization, the computational framework described herein allows for derivative-free and continuous optimization within complex, multi-agent driving environments. The techniques herein can be applied to uncertain environments that include any number of additional agents operating autonomously and independently from the vehicle, and may identify optimal trajectory solutions even in complex and non-smooth search spaces. In some examples, the techniques described herein may apply continuous optimization, in which the solution comprises a continuous and kinodynamically feasible trajectory that the vehicle is capable of following. These techniques also may use derivative-free optimization, in which the objective optimization is performed independently, without reliance on any derivatives that may be unavailable (whether due to computational limitations, mathematical limitations, etc.) and/or unreliable for the non-smooth and noisy search spaces representative of complex multi-agent environments.

In various examples described herein, a planning component associated with an autonomous vehicle may perform trajectory optimization by perturbing and vectorizing trajectories into sets of variables representing different vehicle state parameters at different points/times in the trajectory. For instance, a trajectory between a start state and end state may cover one or multiple units of distance and/or one or multiple units of driving time. The planning component may segment the trajectory into any number of segments based on time (e.g., 0.1 sec segments, 0.2 sec segments, . . . , 0.5 sec segments, . . . , 1 sec segments, etc.), and/or based on longitudinal driving distance (e.g., 5 meter segments, 10 meter segments, . . . , 50 meter segments, etc.). For each segment, the planning component may parameterize the segment into one or multiple vehicle state parameters. A vehicle state parameter may include any parameter associated with a state of the vehicle at a particular trajectory point (e.g., a position, pose, velocity, yaw rate, steering angle, etc.) and/or a particular vehicle control that may be applied at the particular trajectory point (e.g., an acceleration or braking control, a steering rate change, yaw rate change, etc.). In some examples, the planning component may use a set of vehicle state parameters for each segment in the trajectory. As an example, a parameter set associated with a trajectory point may be defined by two parameters: a velocity, and a lateral position of the vehicle, at the time (or longitudinal position) on the route associated with the trajectory point. As another example, a parameter set associated with a trajectory point may include a velocity and a curvature change (or steering angle change) at the time (or longitudinal position) on the route associated with the trajectory point.

As described below in more detail, the planning component may determine possible trajectories (e.g., lowest cost and/or optimal trajectories) for the vehicle by optimizing over a vector of parameters defining vehicle actions at various points (e.g., times and/or positions) in the trajectory. In some examples, the planning component may construct a trajectory vector representing a particular vehicle trajectory, including a set of variables corresponding to each vehicle state parameter (e.g., velocity, curvature, lateral offset, etc.) at each point (e.g., segment) in the trajectory. As an example, for a trajectory having 16 distinct time steps (e.g., an 8 second trajectory with 0.5 second time segments), and a set of two parameter for each trajectory point, then the resulting vector determined for a trajectory may include 32 variables.

Although some examples described herein refer to 32-variable vectors, vectors of different sizes and/or structures, based on any number of trajectory points/segments and any number of vehicle state variables, may be used in other examples.

During the optimizing process, an optimizer and/or perturbation generator of the planning component may be used to construct perturbed vectors representing various perturbed vehicle trajectories. In some instances, a set of vehicle state parameters of an existing trajectory may be perturbed (or modified) in accordance with an optimization algorithm, after which the perturbed parameters are stored in a vector representing a perturbed trajectory. Additionally or alternatively, the planning component may initially construct the vector including the state parameters of the existing trajectory, after which the vector variables may be perturbed to form the perturbed vector.

The vectors of vehicle state parameters, over which the optimization is performed, may include sets of absolute vehicle state values (e.g., positions, velocities, steering angles, etc.) or may include vehicle state values that are relative to a baseline trajectory. For instance, the planning component may initially determine a baseline trajectory, such as the center line and current speed limit of the driving lane, based on map data of the environment. In such cases, the vectors of vehicle state parameters may represent a perturbed trajectory relative to the baseline trajectory. For example, a perturbed trajectory point may be defined by a velocity difference and a lateral offset, relative to the same point in the baseline trajectory. As another example, a perturbed trajectory point may be defined by a velocity difference and curvature difference, relative to the same point in the baseline trajectory. In such examples, a perturbed vector may include the sets of perturbed vehicle state parameters, relative to those of the baseline trajectory, for each point in the trajectory.

After vectorizing and/or perturbing various trajectories representing different possible trajectories of the vehicle through the environment, the planning component may evaluate the perturbed trajectories to determine a lowest-cost trajectory. As described below in more detail, the cost evaluation may be based on any number of cost variables, including vehicle-centric costs (e.g., costs that are not related to other objects in the environment) and costs based on potential interactions between the vehicle and one or more additional agents or other objects in the driving environment (e.g., a cost associated with comfort of another agent in a scene responding to a maneuver of the vehicle). In some examples, the planning component may execute an active prediction trained ML model configured to receive inputs including an intended vehicle trajectory (e.g., a perturbed trajectory for the optimization) and a current representation of the driving environment at a starting point of the trajectory. Based on the current driving environment and the perturbed trajectory, the active prediction model may determine one or more predicted future trajectories (and/or other state data) for the vehicle itself, as well as for any number of additional agents in the environment reacting to such vehicle motion.

In some examples, the active prediction model(s) described herein may be trained to predict the future state of the environment as a whole, taking into account potential interactions between the autonomous vehicle and other agents, as well as potential interactions between agents and other agents (and/or static objects) in the environment. In at least some examples, the active prediction model may be an ML model that can be applied recurrently (and/or autoregressively) to determine sequences of predicted trajectories/environment states. For instance, an output of the active prediction model (e.g., predictions of the vehicle/agent trajectories and states at a first future time step) can be provided back as input into a subsequent iteration of the model to obtain predictions of the vehicle/agent trajectories and states at the next time step, and so on. In other examples, the active prediction model(s) need not be a recurrent model, and may provide output in a single execution that includes the predicted trajectories of the vehicle and the additional agents for multiple future time steps of the perturbed trajectory.

After using the prediction model to predict the potential future vehicle states and/or trajectory(ies) for the autonomous vehicle and additional agents in the environment, based on the perturbed trajectory, the planning component may analyze the predicted states/trajectories from the model to evaluate various costs associated with the perturbed trajectory. For instance, the planning component may compute a cost associated with a perturbed trajectory based on a number of different cost types, including safety costs (e.g., based on determining potential intersection points and/or other potential interactions between the vehicle and other objects in the environment, the proximity of the vehicle to non-drivable surface(s), etc.), comfort costs (e.g., velocity, acceleration, and/or jerk metrics associated with the perturbed trajectory, etc.), route progress costs (e.g., a displacement or progress metric based on the driving route, etc.), and the like. To evaluate the cost of a candidate action node, the planning component may sum the costs associated with the sequence of states comprising the perturbed trajectory. As noted above, the costs determined for a perturbed trajectory may include costs associated with the vehicle itself (e.g., route progress, driving consistency, passenger comfort, law abidance, etc.), and costs based on potential interactions between the vehicle and/or other agents in the environment (e.g., potential collisions or near-miss collisions, aggressive or discourteous driving, failure to yield, etc.). Additional costs associated with a perturbed trajectory can include costs based on predicted events or states within the driving environment that involve the autonomous vehicle only indirectly (or not at all), such as potential interactions between combinations of other agents and/or static object, potential traffic obstructions (e.g., lane or intersection blockages) within the driving scene, etc. In these examples, even when the proposed trajectory of an autonomous vehicle is not directly responsible for causing a potential collision, traffic obstruction, or other undesirable occurrences/states within the driving scene, due to the complexity of these driving scenes and the independent autonomous operation of the other agents, even small changes to the proposed vehicle trajectory can have large cascading effects on the predicted driving environment.

For each perturbed trajectory, the planning component may use a cost evaluator to determine the costs associated with the perturbed trajectory, based on the analysis of the predicted future driving scene, the predicted vehicle and agent trajectories, etc. Based on the costs associated with the various perturbed trajectories, the planning component may perform the trajectory optimization in accordance with one or more optimization algorithms. Using the various algorithms described herein, the planning component may evaluate the costs associated with various perturbed trajectories to determine subsequent perturbed trajectories to be evaluated, and/or select an optimal (e.g., lowest-cost) trajectory from the perturbed trajectories that may be used to control the vehicle.

The framework described herein may be compatible with any number of optimization algorithms and techniques, which can be performed alternatively or in combination by the planning component. In some examples, the planning component may use a stochastic trajectory optimization algorithm, including cross-entropy method (CEM), exponential natural evolution strategies (xNES), and/or other stochastic techniques for sampling and optimization. In some cases, stochastic optimization may scale well with processing via Graphics Processing Units (GPUs), and/or other parallel compute architectures. Accordingly, in some instances, the planning component may execute stochastic trajectory optimization in which the optimization algorithm is executed on the CPU and the compute-heavy active prediction and/or cost evaluation are executed on a GPU on the autonomous vehicle.

As noted above, the perturbed trajectory vectors over which the optimization is performed may include sets of vehicle state parameters that are relative to a baseline trajectory. For instance, a perturbed vector may store a set of velocity differences, lateral offsets, and/or curvatures representing a perturbed trajectory relative to a baseline trajectory. In some cases, a baseline trajectory may be a relatively simple trajectory determined using map data of the environment (e.g., a trajectory following the center line and fixed speed within the driving lane). In other cases, a baseline trajectory may be the result of a previous trajectory optimization. For instance, the planning component may initially perform one or more tree search algorithms and/or other relatively quick trajectory optimizations, and may use the results of these searches/optimizations as the baseline trajectories of the optimization techniques described herein.

In some examples, the optimizations and perturbation techniques described herein may result in certain perturbed trajectories that are infeasible for the autonomous vehicle. As used herein, an infeasible trajectory may refer to a trajectory that is discontinuous and/or that the vehicle is kino-dynamically incapable of performing. When the perturbations determined by the optimization algorithm result in an infeasible trajectory for the vehicle, the planning component can determine a closest approximate kino-dynamically feasible trajectory to be used as the perturbed trajectory. Additionally or alternatively, the active prediction model may be configured to receive an infeasible vehicle trajectory, from which it may determine and output an associated feasible trajectory for the vehicle, along with the corresponding predicted agent trajectories, vehicle/agent/object state, and predicted driving environment scene data, etc.

As these and other examples illustrate, the techniques described herein may improve the functioning, safety, and driving efficiency of autonomous and semi-autonomous vehicles. Specifically, these techniques may provide improved optimized trajectories by taking into account both the trajectory costs associated with the vehicle itself and those associated with the various predicted interactions between the vehicle, additional agents, and/or objects as the driving scene progresses. Further, these techniques may determine optimal trajectories quickly and efficiently, even within complex multi-agent environments represented by non-smooth and noisy search spaces. Processing speed and efficiency may be further improved in some examples by using stochastic trajectory optimization with GPUs or other parallel architecture to perform the compute-heavy prediction and/or cost evaluation operations. Various examples may provide additional technical advantages in that any number of various optimization algorithms may be used in a plug-and-play manner to perform the trajectory optimization. In some cases, the trajectory optimization also may be performed in conjunction with a tree search or other fast run-time optimization search performed during an initial stage before performing the full optimization using the techniques described herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 illustrates an example scenario 100 including an autonomous vehicle 102 configured to perform the trajectory optimization techniques described herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to trajectory-finding in video games, manufacturing, augmented reality, etc.

The autonomous vehicle 102 may comprise computing device(s) 104 that may include one or more ML models and/or the navigation systems discussed herein. For example, the computing device(s) 104 may comprise a perception component 106 and/or a planning component 108. As discussed below, the planning component 108 may include trajectory optimization components configured to perform stochastic optimization and/or other optimization techniques to determine an optimal for the autonomous vehicles 102 to traverse the driving environment. The planning component 108 also may include, or may invoke, one or more prediction components (e.g., an active prediction ML model) and/or cost evaluation components configured to analyze perturbed trajectories as potential trajectories that the autonomous vehicle 102 may follow. The perception component 106 and/or the planning component 108 may comprise the hardware and/or software for conducting the operations discussed herein related to trajectory determination and navigation of the autonomous vehicle 102. The various navigational systems described herein may comprise more or less components, but the perception component 106 and/or planning component 108 are given as a non-limiting example for the sake of comprehension.

In some examples, the various vehicle navigation systems and functionalities described herein may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In the example scenario 100, the autonomous vehicle 102 may be driving within an environment 110, which is depicted as a driving scene at a particular time and particular location. Prior to determining a trajectory to follow, the autonomous vehicle 102 may receive and/or determine a route including a start state (e.g., the current state of the autonomous vehicle 102) and an end state representing the location, velocity, and/or pose, etc., that the autonomous vehicle 102 intends to achieve. The planning component 108 may determine a route based at least in part on sensor data, map data, and/or based on an intended destination of a mission (e.g., received from a passenger, from a command center, etc.). As noted above, references to a "state" or "vehicle state" may include geometric state data, such as position (or location) and/or a pose (e.g., position and/or orientation/heading including yaw and steering angle) of a vehicle. Additionally, in some examples, a vehicle state may comprise any combination of a geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.).

As the autonomous vehicle 102 operates within the environment 110, it may receive map data of the environment (e.g., from a local or remote map system), and perception data (e.g., sensor data) from the perception component 106. The map data may include, for example, road data determined based on a map of the driving environment 110 and/or localizing the autonomous vehicle 102 within the environment. For instance, the map data may include data associated with any number of road segments (e.g., lane segments) in the driving environment 110, such as the location (e.g., boundaries), size (e.g., length and width), and shape (e.g., curvature) of the road segment, as well as additional attributes of the road segment such as directionality, speed limit, gradient, road surface, etc.

The autonomous vehicle 102 also may receive sensor data from sensor(s) of the autonomous vehicle 102 (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc. The perception component 106 may include one or more ML models and/or other computer-executable instructions for detecting, identifying, segmenting, classifying, and/or tracking objects from sensor data collected from the environment of the autonomous vehicle 102. For example, data generated by the perception component 106 may be used by the autonomous vehicle 102 to localize its position within the driving environment relative to the map data. In some instances, the perception component 106 also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

As discussed in the examples herein, the planning component 108 may use the map data and/or perception data, and apply trajectory optimization techniques to determine a trajectory 112 for the vehicle to follow to traverse the driving environment 110. In some examples, the trajectory 112 may continuously and feasibly connect a start state (e.g., the current vehicle state) with an intended end state of the route. As discussed below in more detail, the planning component 108 may determine the trajectory 112 as an improved or optimal trajectory from a baseline trajectory, using stochastic optimization (and/or optimization algorithms) that takes into account the future predicted driving scene(s) of the environment 110, including the predicted trajectories of the autonomous vehicle 102 and the predicted trajectories and states of other agents or objects in the environment. In some cases, the trajectory 112 may represent an optimal and/or lowest-cost trajectory determined by the planning component 108 after evaluating a number of kino-dynamically feasible trajectories that the autonomous vehicle 102 may perform, based on safety costs (e.g., potential interactions with objects/agents), passenger comfort costs, route progress costs, etc.

In this example, the planning component 108 has determined a single trajectory 112 as an optimal trajectory for the autonomous vehicle 102 to traverse the environment 110. In other examples, the planning component 108 may determine any number of alternative low-cost trajectories using the techniques described herein. To implement a selected trajectory (or control trajectory), such as trajectory 112, the planning component 108 may generate, substantially simultaneously, a plurality of potential vehicle control actions for controlling the motion of the autonomous vehicle 102 over a time period (e.g., 5 seconds, 8 seconds, 10 seconds, etc.) in accordance with a receding horizon technique (e.g., 1 micro-second, half a second, multiple seconds, etc.) based at least in part on the trajectory 112. The planning component 108 may select one or more potential vehicle control actions from which to generate a drive control signal that can be transmitted to drive components of the autonomous vehicle 102, to control the vehicle to traverse the trajectory 112.

Figure 2:
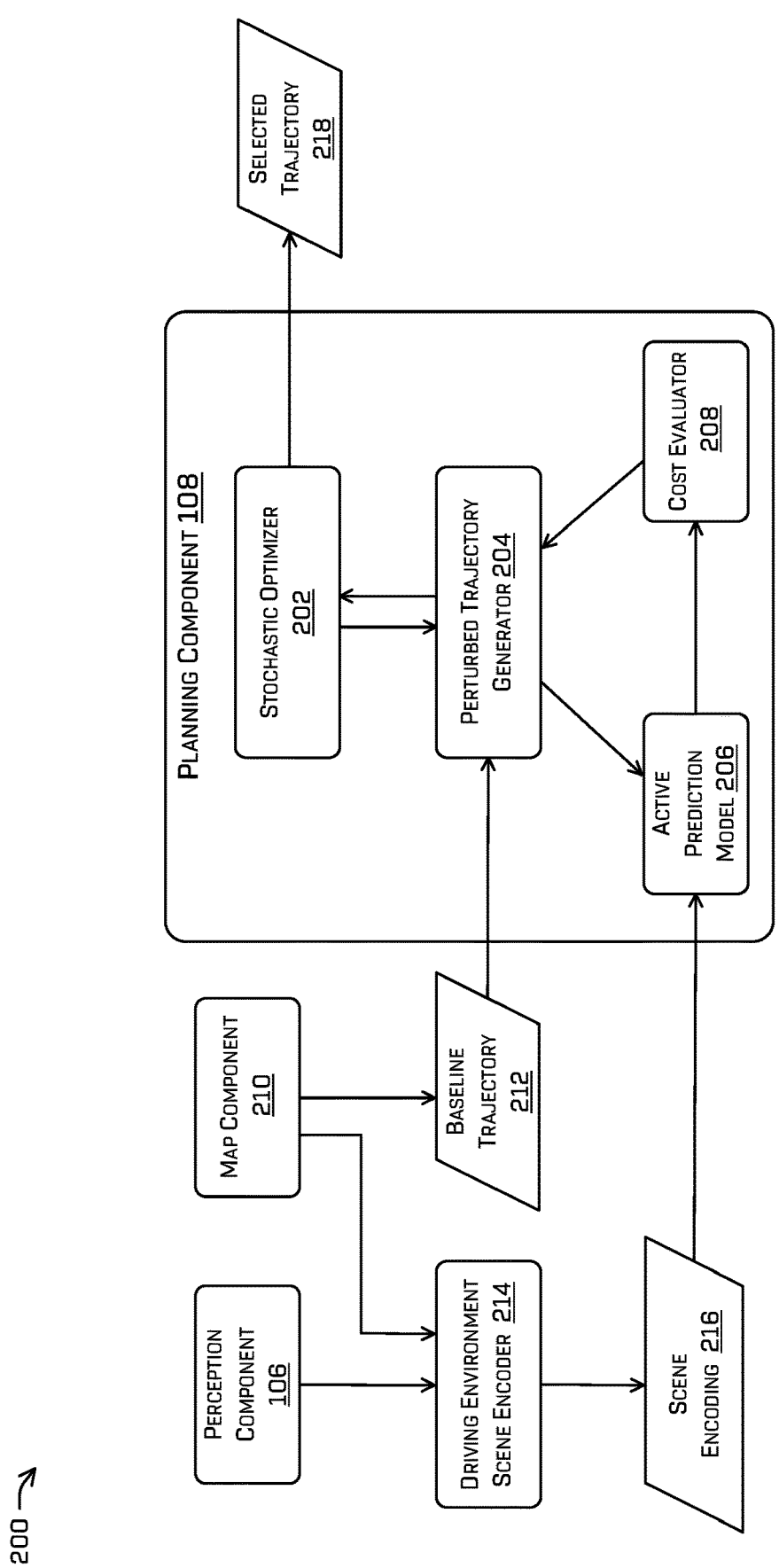
FIG. 2 is a block diagram illustrating an example system for using a planning component to determine a selected trajectory for an autonomous vehicle, in accordance with one or more examples of the disclosure.

FIG. 2 depicts an example system 200 including a planning component 108 of an autonomous vehicle configured to determine a trajectory for a vehicle using optimization algorithms and techniques, with cost evaluations based on predicted vehicle and agent trajectories in the environment. As discussed below, at least some of the components of system 200 may be implemented with a planning component 108, such as an optimization component 202, a perturbed trajectory generator 204, an active prediction model 206, and/or a cost evaluator 208. However, as described below, one or more of these components may be implemented within separate components within the computing device(s) 104 (e.g., within a prediction component) and/or within separate computing devices/systems (e.g., within a GPU-based computing system).

The system 200 may be implemented to perform on-board trajectory optimization for an autonomous vehicle 102. In some examples, the optimization component 202 may initiate the trajectory optimization (e.g., in response to a request received or determined by the planning component 108), and may drive the trajectory optimization process to determine one or more trajectories that the autonomous vehicle 102 may follow to traverse the environment to an ending state. The optimization component 202 may use one or more optimization algorithms to generate a number of solution sets (or variable sets), where each solution set may include a number of parameters (or variables). As shown in this example, the optimization component 202 may be a stochastic optimization component using stochastic techniques in which variables are generated with at least some degree of randomness. As noted above, stochastic optimization may provide particular advantages when using GPUs and/or other parallel compute architectures, as the variable sets may be determined without reliance on derivatives and may be evaluated independently and in parallel. Such stochastic exploration may further aid in ensuring that a solution isn't merely a local minima.

In other examples, the optimization component 202 need not perform stochastic optimization techniques, and may be configured to use any number of possible optimization algorithms/techniques. For instance, when the optimization component 202 is a stochastic optimizer, the algorithms/techniques may include cross-entropy method (CEM) and/or exponential natural evolution strategies (xNES) for variable set sampling and optimization. However, the optimization component 202 also may use a derivative-free least squares (DF-LS) technique using least-squares to exploit structure, and/or a derivative-free constrained optimization (DF-COPT) technique using local linear-quadratic approximation. In some examples, the optimization component 202 may be agnostic with respect to the optimization algorithms and/or techniques used, and a single technique or any combination of multiple techniques may be used in conjunction to determine the optimal variable set(s) representing optimal trajectories. Additionally, in the framework depicted in system 200, the optimization component 202 may be implemented as a generic optimizer in the sense that the optimization technique it performs is not limited to or specifically tied to optimization of trajectories. For instance, the optimization component 202 might have no concept of a trajectory, but nonetheless may perform the steps of determining proposed solutions sets of variables/parameters, identifying and outputting optimal solutions sets that correspond to optimal vehicle trajectories within the environment.

The perturbed trajectory generator 204 may receive proposed solutions sets from the optimization component 202, and use the variable sets to construct perturbed trajectories. In some examples, the solutions sets received from the optimization component 202 may include variables representing vehicle state parameters, and the perturbed trajectory generator 204 may map and/or transform the vehicle state parameters to form a perturbed trajectory. For instance, the perturbed trajectory generator 204 may segment a driving route and/or baseline trajectory into a number of segments (or trajectory points), identify one or more vehicle state parameters for each segment/point, and map the variable received from the optimization component 202 into a vector defining a trajectory. As an example, the optimization component 202 may provide an N-variable solution set to the perturbed trajectory generator 204, which may map each variable to a particular vehicle state value and/or a particular segment/trajectory point. As an example, for trajectories having 16 distinct segments/points (e.g., 0.5 sec segments for an 8 sec trajectory) and having two vehicle state/motion parameters for each point (e.g., a velocity and a lateral position parameter), the perturbed trajectory generator 204 may perform a one-to-one mapping from a 32-variable solution set provided by the optimization component 202. It can be understood that, in other examples, any variable set sizes, trajectory points/segments, numbers of vehicle state parameters, and/or mapping arrangements (including one-to-one, one-to-many, or many-to-one) may be used.

In some examples, the perturbed trajectory generator 204 may use the variable set received from the optimization component 202 to modify an existing trajectory, such as a baseline trajectory and/or a trajectory output by a previous optimization. As shown in this example, the autonomous vehicle 102 may receive map data from a map component 210 corresponding to the current driving environment, and the planning component 108 may use a baseline trajectory 212 determined from the map data. For instance, baseline trajectory 212 may be a simple lane reference trajectory that tracks the center line of a driving lane, following a predetermined fixed speed (e.g., the current speed limit of the driving lane), for the length of the driving route. The perturbed trajectory generator 204 may use a variable set received from the optimization component 202 to modify (or perturb) the baseline trajectory into a perturbed trajectory. For example, a perturbed trajectory may be defined by a velocity difference and lateral offset for each trajectory point, relative to the same point in the baseline trajectory. As another example, a perturbed trajectory may be defined by a velocity difference and curvature difference for each trajectory point, relative to the same point in the baseline trajectory.

As noted, the perturbed trajectory generator 204 may generate perturbed trajectories based on the vehicle state parameters (and/or other variables) provided by the optimization component 202. The perturbations of the vehicle state parameters may be based on the variable set received from the optimization component 202 (which may be based on the optimization algorithms used by the optimization component 202) and/or based on the type(s) of vehicle state parameters to be perturbed within the vector. As noted above, when a stochastic algorithm is used by the optimization component 202, it may generate non-deterministic perturbed variable values with at least some degree of randomness. In response to receiving the set of perturbed variable values from the optimization component 202, the perturbed trajectory generator 204 may generate the perturbed trajectory by perturbing the associated vehicle state parameters of the trajectory, such as the velocity parameter, curvature parameter, and/or lateral offset parameter, which can be perturbed at one or more trajectory points from the baseline trajectory. For instance, perturbing a lateral offset parameter at a point (e.g., time step or longitudinal distance) in a trajectory may include transforming the perturbed value received from the optimization component 202 into a lateral offset within a predetermined range between a left-side lateral edge and a right-side lateral edge of the lane/roadway. As another example, perturbing a curvature parameter at a point in a trajectory may include transforming the perturbed value from the optimization component 202 into a curvature value within a curvature range based on the maximum steering angles of the vehicle. As yet another example, to perturb a velocity parameter at a point in a trajectory, the perturbed trajectory generator 204 may normalize the velocity parameters of the baseline trajectory so that a zero value represents one-half the speed limit. The perturbed trajectory generator 204 then may transform the perturbed value from the optimization component 202 into a velocity value within a velocity range between zero and the speed limit for the road segment.

Because the variable sets received from the optimization component 202 may be stochastic, non-deterministic and/or otherwise unpredictable, the perturbed trajectories generated based on certain variable sets might not continuous, smooth, and/or feasible trajectories that the autonomous vehicle 102 is capable of following. As a result, in some cases the perturbed trajectories generated by the perturbed trajectory generator 204 might be referred to as action reference vectors instead of (or in addition to) trajectories. In some examples, when the perturbed trajectory generated by the perturbed trajectory generator 204 is not feasible for the autonomous vehicle 102, the planning component 108 may perform a smoothing function to generate a feasible perturbed trajectory that most closely approximates the infeasible perturbed trajectory based on the received variable set. Additionally or alternatively, the active prediction model 206 may be configured to receive both feasible and infeasible perturbed trajectories from the perturbed trajectory generator 204, which may obviate the need for the planning component 108 to perform a smoothing operation on the perturbed trajectory.

The active prediction model 206 may include one or more ML models trained to output, based at least in part on the perturbed trajectory from the perturbed trajectory generator 204, predictions of future trajectories of the autonomous vehicle 102 and/or additional agents within the driving environment. In some examples, the active prediction model 206 may be trained to determine a predicted future state of the environment as a whole, including predicted trajectories for the autonomous vehicle and all other agents (and/or other objects or features) in the environments. For instance, for any objects in the environment (including the autonomous vehicle 102 and any number of additional autonomous agents and/or non-agent dynamic objects), the active prediction model 206 may use the current states and trajectories of the objects, along with the features of the driving environment determined from map data (e.g., road positions and curves, lane permissibility, speed limits, traffic signals, crosswalks, etc.), to determine predicted future states for the objects. Additionally, the active prediction model 206 may use deep learning and/or other ML-based techniques to predict various interactions between the objects in the environment, such as potential collisions, near-miss collisions, yielding behaviors, merging, etc. In response to predicting a potential interaction between the vehicle and an agent/object (or between an agent and additional agents/objects), the active prediction model 206 may proactively predict how each object may react to the potential interaction (e.g., by yielding, steering, braking, swerving, accelerating, etc.) and may determine the predicted trajectory the object accordingly.

As such, when a perturbed trajectory is received and input to the active prediction model 206, the output of the active prediction model 206 may include a modified perturbed trajectory based on predictions of interactions between the vehicle and any agents/objects in the driving environment. As noted above, in some cases, the active prediction model 206 also may receive a perturbed trajectory that is kinodynamically infeasible for the vehicle to perform. In such cases, the active prediction model 206 may modify the infeasible perturbed trajectory, as part of predicting the future driving environment and/or potential interactions, into a feasible perturbed trajectory for the vehicle.

Based on the input driving environment (e.g., a scene encoding 216) and input vehicle trajectory (e.g., perturbed trajectory), the active prediction model 206 may output a set of predicted future trajectories and/or predicted future driving scenes. The output may include predicted trajectory points and/or a driving scene encoding for any number of discreet time steps over the time period corresponding to the vehicle trajectory. In some cases, the output of the active prediction model 206 may include trajectories and/or driving scene encoding for a single most likely predicted future of the driving environment. In other examples, the active prediction model 206 may output any number of alternative trajectories for the autonomous vehicle 102, the various agents, and/or the driving environment as a whole. As noted above, in complex multi-agent environments, the behaviors of independent and autonomous agents (and/or other objects) cannot be predicted with certainty, and agents may react to the different possible trajectories/paths taken by the autonomous vehicle 102 in unpredictable ways. As a result, the active prediction model 206 may output multiple alternative predicted trajectories and/or driving scene encodings in some cases. The alternative future predictions may include confidences and/or rankings determined by the active prediction model 206, based on the likelihood of the particular set of trajectories/future driving scenes.

In some examples, the active prediction model 206 may be implemented based at least in part on the various techniques and systems described in U.S. patent application Ser. No. 17/351,641, filed Jun. 18, 2021, and entitled, "Active Prediction Based On Object Trajectories," the entire contents of which are incorporated herein by reference in their entirety for all purposes.

As shown in this example, the active prediction model 206 may receive as inputs a vehicle trajectory (e.g., a perturbed trajectory from the perturbed trajectory generator 204) as well as a representation of the driving environment in which the vehicle is operating. In this example, a driving environment scene encoder 214 may generate a scene encoding 216 representing the current environment, based at least in part on the map data from a map component 210 and/or perception data from the perception component 106. For instance, based on the perception component 106 captured by the vehicle sensors, the driving environment scene encoder 214 may generate a scene encoding 216 (e.g., a scene embedding) which may be a vector unique to the particular driving scene and scenario, representing the driving environment at a particular time in the log data. In some cases, the driving environment scene encoder 214 may use a neural network architecture that is trained to output scene encodings based on inputs a combination of map data and data perceived by the vehicle in the environment. For instance, the driving environment scene encoder 214 may receive input data including a representation of the driving environment at a specific time (e.g., map data and/or a road network), perceived road and traffic signal data at the specific time (e.g., traffic light states, road permissibility, etc.), proximate agent data for static and/or dynamic agents in the environment at the specific time, and encoded vehicle state data including the intended destination of the vehicle at the specific time. A neural network within the driving environment scene encoder 214 may transform the input data into the scene encoding 216, which may be represented as a multidimensional vector within a driving scene embedding space. Additional examples of various techniques for determining scene encodings and/or other representations of an environment can be found, for example, in U.S. patent application Ser. No. 17/855,088, filed Jun. 30, 2022, and entitled, "Machine-Learned Component For Vehicle Trajectory Generation," the entire contents of which are incorporated herein by reference in their entirety for all purposes.

As shown in this example, the active prediction model 206 may determine predicted future trajectories (and/or other predicted vehicle state data) for the autonomous vehicle and any other agents/objects in the environment, and/or predicted future states for the environment as a whole. In some examples, the active prediction model 206 may output a predicted future scene encoding, having a similar or identical encoding format as that of the current scene encoding 216. As noted above, the active prediction model 206 also can be applied recurrently to determine sequences of predicted vehicle and agent trajectories, and/or scene encodings.

The cost evaluator 208 may receive the predicted future trajectories (and/or predicted future environment states) from the active prediction model 206, and may evaluate the predicted trajectories/environments to determine sets of associated costs. In some examples, costs may be determined by evaluating individual predicted trajectories for the autonomous vehicle 102 and/or any other agents in the environment. The cost evaluator 208 may include heuristics and/or ML-based components configured to compute costs associated with potentially unsafe, illegal, or risky driving maneuvers. Such costs, which may be referred to as safety costs, may include speeding, driving out of a lane or crossing a double-yellow line, stopping in a crosswalk, braking, accelerating, or steering too sharply based on the road/lane configuration and current driving conditions, etc. Additional costs determined by the cost evaluator 208 may include passenger comfort costs (e.g., based on sharp turns, unnecessary turns, bumps, jerkiness, or inconsistency of the trajectory, etc.), and route progress costs (e.g., based on longitudinal distance obtained, vehicle velocity, and/or time-to-go costs between the current vehicle position and the route end state). For these costs and the various other costs described herein, the cost evaluator 208 may be configured to evaluate the trajectories output by the active prediction model 206, including the predicted trajectory of the autonomous vehicle 102 and/or of the additional agents in the environment, and to compute cost values associated with the predicted trajectories, individually or in combination.

In addition to costs based on evaluating individual trajectories, the cost evaluator 208 also may determine costs by analyzing multiple predicted trajectories together (and/or the predicted environment as a whole) to identify potential interactions between the autonomous vehicle 102 and one or more additional agents or other objects in the environment. For instance, the cost evaluator 208 may compute cost values based on determining potential intersecting points between the trajectories of the autonomous vehicle 102 and an agent (or multiple agents) at any future time in the predicted driving scene. Such interaction costs may include costs based on detecting a potential collision or near-miss collision, a distance between the vehicle and objects and/or buildings, a failure to yield and/or an aggressive driving cost of the autonomous vehicle 102 relative to other vehicles, pedestrians, bicycles, etc. In some examples, the cost evaluator 208 may determine interaction costs based on potential intersecting points between multiple agents that might not include the autonomous vehicle 102.

In various examples, the cost evaluator 208 may evaluate individual trajectories, groups of potentially interacting trajectories, and/or the driving scene/environment as a whole, at multiple predicted future time steps. As noted above, the active prediction model 206 may provide predicted trajectories and/or predicted driving scene encodings over a time period (e.g., 2 seconds, 5 seconds, 10 seconds, etc.) that may include any number of discreet time steps. The cost evaluator 208 may evaluate the trajectories/driving scene and determine costs associated with individual discreet time steps, and may aggregate the various costs (e.g., including both individual trajectory costs and vehicle-agent interaction costs) over the discreet time steps for the entirety of the trajectory of the autonomous vehicle 102. In some examples, the cost evaluator 208 may up-weight the costs determined based on earlier time steps in the trajectory, which may be more likely to occur, and down-weight the costs based on later time steps in the trajectory, which may be less likely to occur.

Additionally, when the active prediction model 206 outputs multiple alternative predicted trajectories and/or driving scene encodings, the cost evaluator 208 may compute costs associated with each alternative future prediction. For instance, the cost evaluator 208 may compute a first set of costs associated with a first set of trajectories output by the active prediction model 206, and may separately compute first set of costs associated with a first set of trajectories output by the active prediction model 206. To determine an overall cost associated with the perturbed trajectory, the cost evaluator 208 may aggregate and/or weight costs from the alternative predicted sets of trajectories, using the respective confidence values and/or likelihoods of the sets of trajectories to scale/weight the overall cost computation.

After computing a cost value or set of cost values based on a particular perturbed trajectory, the cost evaluator 208 may provide the cost(s) back to the perturbed trajectory generator 204, which may aggregate and/or output the cost(s) to the optimization component 202. Based on the determined costs, the optimization component 202 may use one or more optimization algorithms (e.g., stochastic optimization) to determine subsequent variable sets to be evaluated. For instance, when one or more stochastic optimization algorithms are implemented by the optimization component 202, the algorithm may non-deterministic techniques (e.g., partially or entirely random) to generate variable sets to be evaluated. In some cases, variables may be generated randomly across a range of values (e.g., 0 to 1) and/or in other cases, random values may be sampled from a normal distribution (or other distribution) so that the sampled values are weighted and/or clustered toward more the vehicle state parameters having higher likelihoods of resulting in feasible, lowest-cost and/or optimal trajectories. For instance, a stochastic optimization algorithm may determine a move from a current trajectory point to the next point in the vehicle trajectory search space according to a probability distribution relative to the optimal move. Examples of stochastic optimization algorithms that may be used to perturb a vehicle trajectory (e.g., a baseline trajectory) during an optimization process may include, but are not limited to an iterated local search, a stochastic hill climbing algorithm, a stochastic gradient descent algorithm, a tabu search, a greedy randomized adaptive search procedure, a simulated annealing algorithm, a differential evolution strategy, and/or a particle swarm optimization. In at least some examples, a pseudorandom number generator may be used by the optimization component 202 as the source of randomness, which can be seeded to ensure the same sequence of random numbers is provided each run of the algorithm. Additionally or alternatively, the optimization component 202 may determine when an optimization algorithm has reached a solution, and may compare the costs associated with the various perturbed trajectories that have been evaluated, to identify one or more optimal (e.g., lowest-cost) trajectories, which may be selected as a selected trajectory 218 (or control trajectory) for the autonomous vehicle 102 to follow.

Figure 3A:
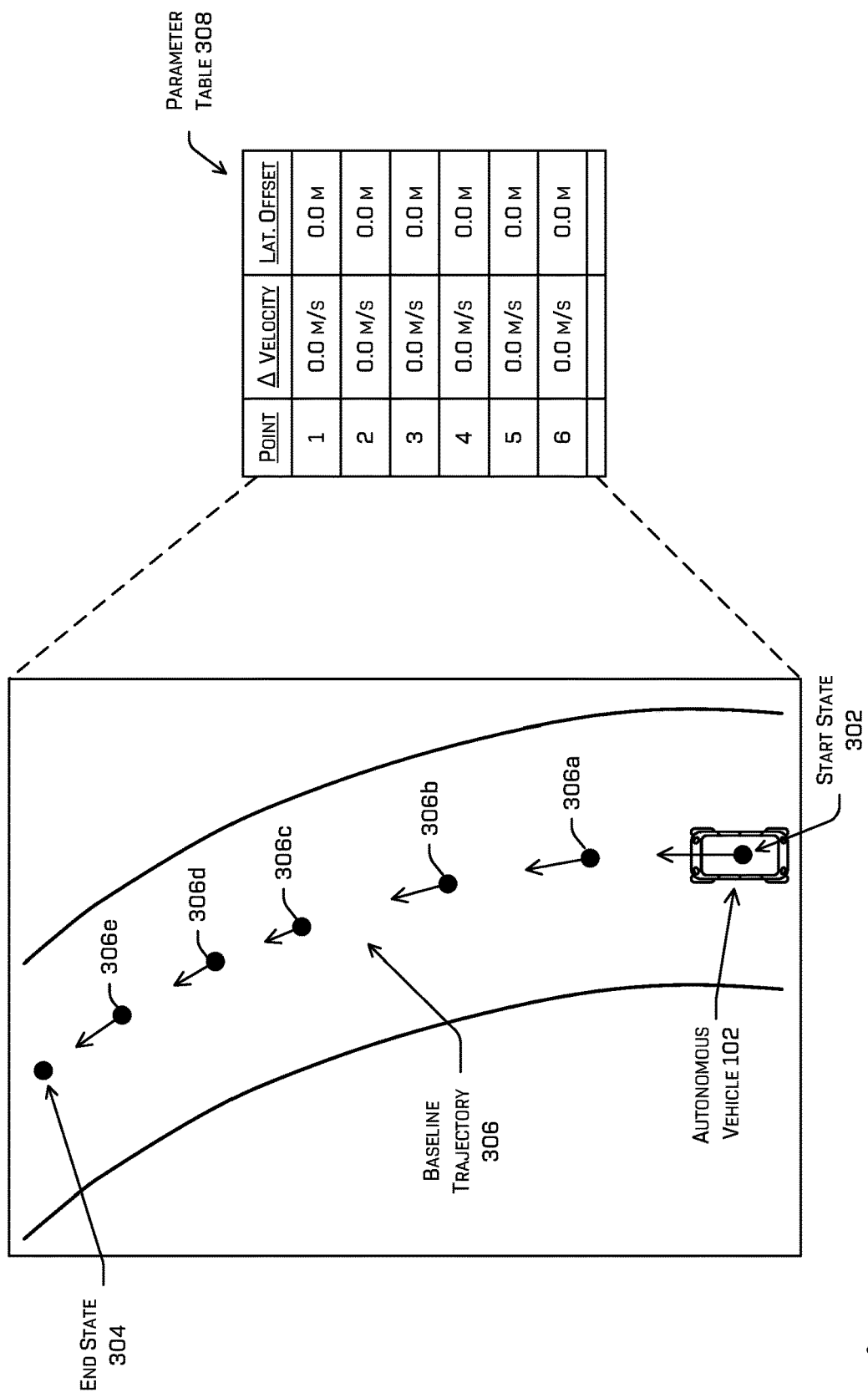
FIGS. 3A-3C illustrate an example of using a stochastic optimization technique to generate a perturbed trajectory for an autonomous vehicle, in accordance with one or more examples of the disclosure.
Figure 3B:
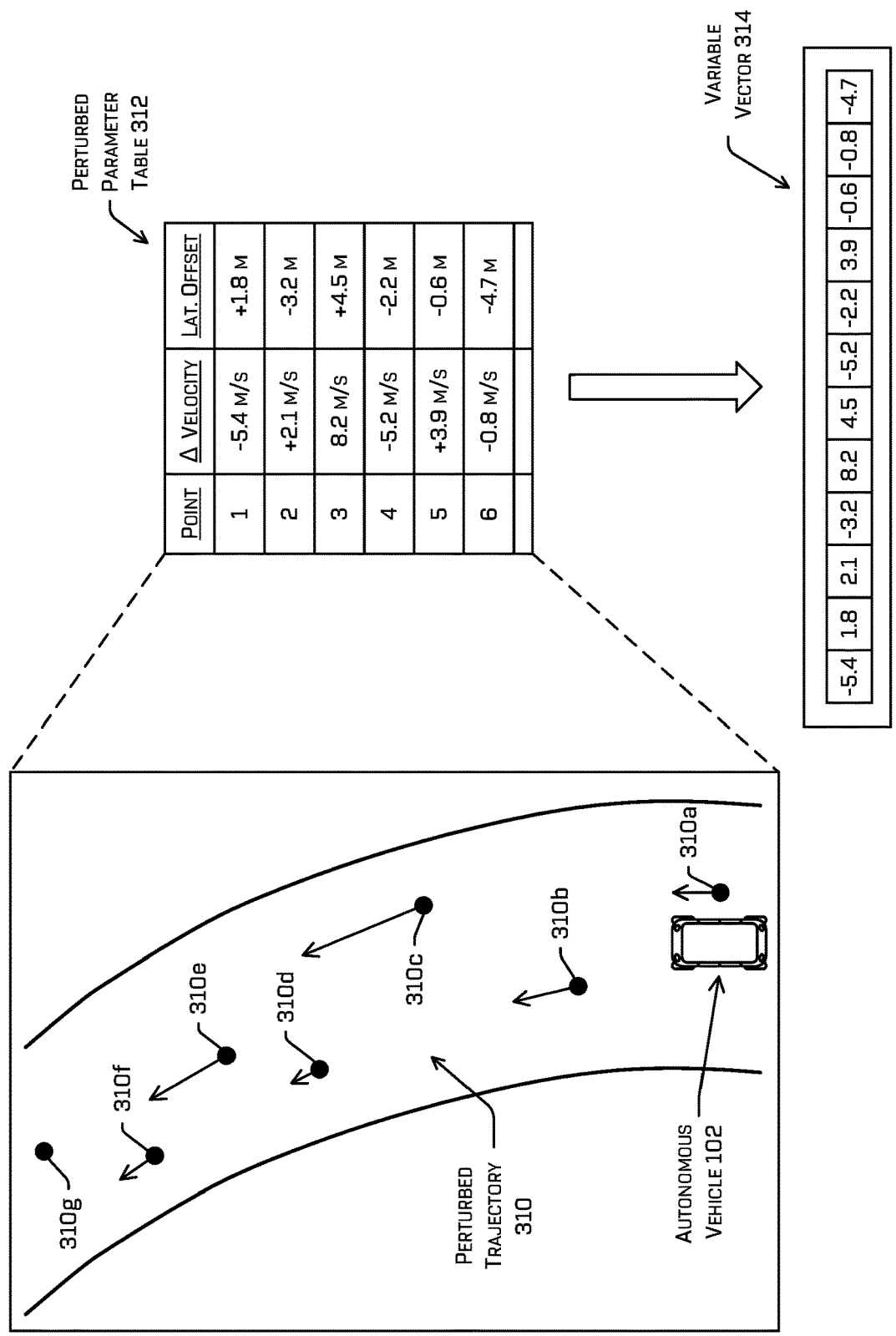
Figure 3C:
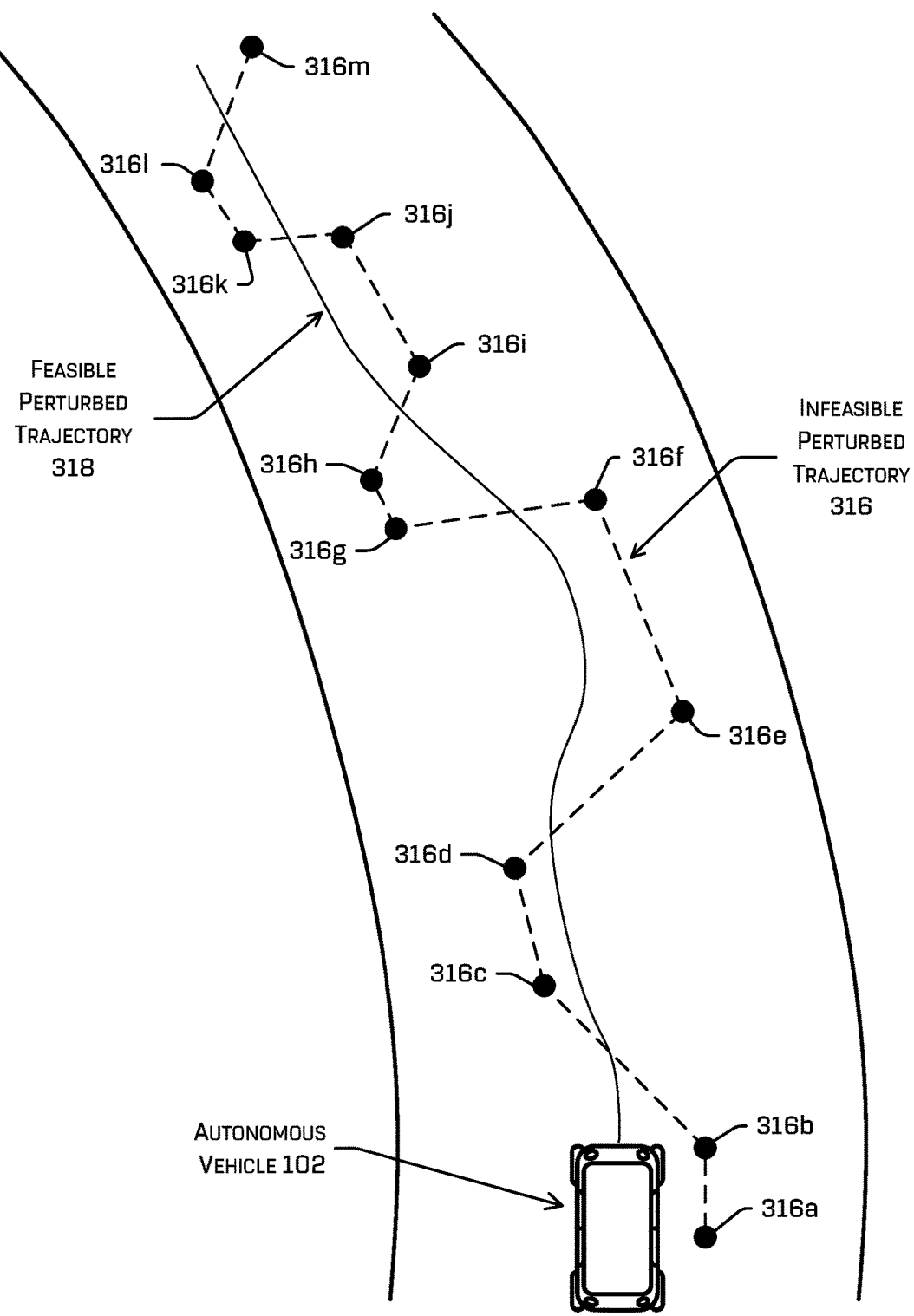

FIGS. 3A-3C depict an example in which a planning component 108 may use an optimization technique (e.g., stochastic optimization) to generate a perturbed trajectory for an autonomous vehicle. As described in this example, a planning component 108 may include an optimization component 202 to perform one or a combination of optimization algorithms, and a perturbed trajectory generator 204 configured to generate perturbed trajectories based on the solutions (e.g., variable sets) provided by the optimization component 202.

FIG. 3A depicts an example driving environment, including an autonomous vehicle 102 intending to traverse along a driving route from a start state 302 to an end state 304. As discussed above, there are any number of possible trajectories that the autonomous vehicle 102 can take to traverse from the start state 302 to the end state 304, with each possible trajectory having a sequence of trajectory points including a number spatiotemporal states of the vehicle (e.g., x-position, y-position, yaw, yaw rate, steering angle, steering angle rate, velocity, acceleration, etc.). In this example, baseline trajectory 306 may represent a simplified and non-optimal trajectory including a number of trajectory points (e.g., 306a-306e, and also may include the start state 302 and/or the end state 304) that follows the center line and a constant speed within the driving lane. The baseline trajectory 306 in this example may be non-optimal in terms of individual trajectory costs (e.g., safety, comfort, route progress), and also does not take into account any other agents/objects within the environment. The parameter table 308 defines a set of vehicle state parameters (e.g., velocity difference and lateral offset) for each trajectory point relative to the baseline trajectory 306. In this example, because the parameter table 308 is associated with the baseline trajectory 306, each relative variable in the parameter table 308 is set to zero.

FIG. 3B depicts an example perturbed trajectory 310 for traversing the driving route, that has been perturbed relative to the baseline trajectory 306. As described above, the perturbed trajectory 310 may include a number of trajectory points (e.g., 310a-310g) determined based on a variable set provided by the optimization component 202 to the perturbed trajectory generator 204. The variable set may correspond to the set of relative vehicle state parameters in the perturbed parameter table 312. Each parameter in the parameter table 312 may define any a velocity difference or a lateral offset of the perturbed trajectory 310, relative to the baseline trajectory 306, at a particular trajectory point. The perturbed trajectory generator 204 also may construct a variable vector 314 including each of the relative vehicle state parameters from the parameter table 312. As described above, the perturbed trajectory generator 204 may provide the perturbed trajectory in the form of a variable vector (e.g., vector 314) as an input to the active prediction model 206.

FIG. 3C depicts an infeasible perturbed trajectory and corresponding feasible perturbed trajectory determined by the optimization component 202 and/or the perturbed trajectory generator 204. In some examples, the trajectory initially generated by the perturbed trajectory generator 204 may be an infeasible trajectory that is discontinuous and/or cannot be kino-dynamically performed by the autonomous vehicle 102. In this example, the perturbed trajectory 310 may be an infeasible perturbed trajectory 316 including a number of trajectory points (e.g., 316a-316m). In such cases, either within the perturbed trajectory generator 204, or within the active prediction model 206, the infeasible perturbed trajectory 316 may be transformed into a feasible perturbed trajectory 318 with modified trajectory points (not shown) that correspond to same time segments and/or trajectory length segments as the trajectory points of the perturbed trajectory 316. For example, the perturbed trajectory generator 204 may determine the feasible perturbed trajectory 318 as the closest approximate trajectory to the infeasible perturbed trajectory 316, that the autonomous vehicle 102 is kino-dynamically capable of performing. Although not shown in this example, when the perturbed trajectory generator 204 modifies an infeasible perturbed trajectory 316 into a feasible perturbed trajectory 318, it also may update the variable vector 314 accordingly before providing it to the active prediction model 206.

FIGS. 4A-4D depict examples of trajectory and/or driving scene prediction, based on a representation of a driving environment of an autonomous vehicle 102 and three perturbed trajectories representing different possible solution trajectories for the autonomous vehicle 102 to traverse the environment. As described in these examples, a driving scene encoder 214 may generate an initial scene encoding 216 (or other driving environment representation) and an active prediction model 206 may predict updated driving scenes and trajectories of the autonomous vehicle 102 and additional agents, based on the scene encoding 216 and various perturbed trajectories.

Figure 4A:
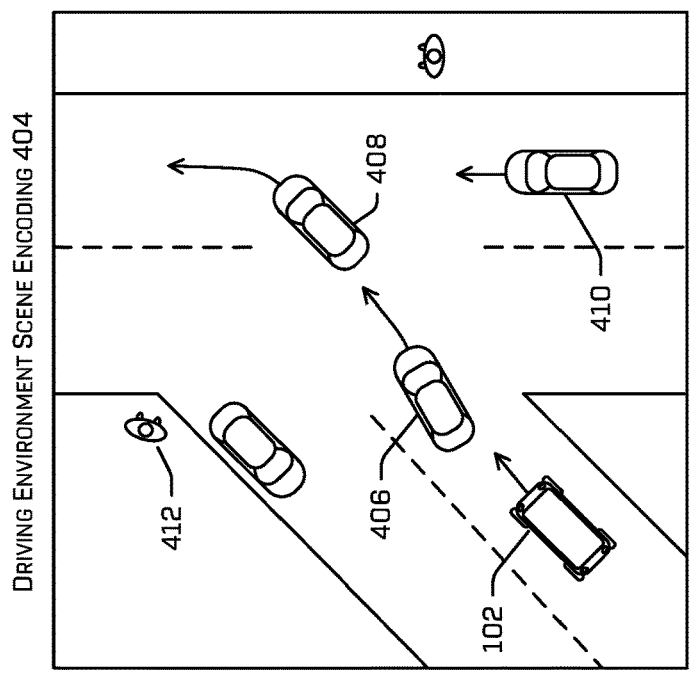
FIGS. 4A-4D illustrate examples of driving scene prediction and cost evaluation associated with a number of perturbed trajectories for an autonomous vehicle, in accordance with one or more examples of the disclosure.
Figure 4A:
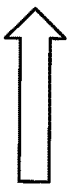
Figure 4A:
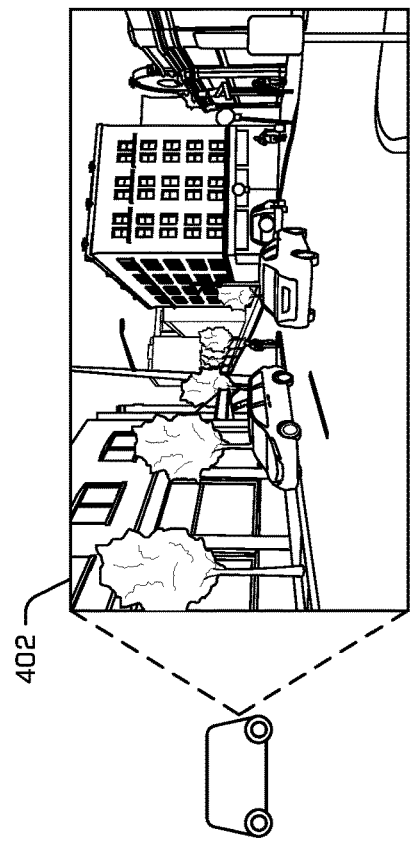

FIG. 4A illustrates an autonomous vehicle 102 capturing sensor data 402 of an environment. In various examples, the sensor data 402 may comprise any combination of image data, lidar data, radar data, sonar data, time-of-flight data, or other depth data. Based on the sensor data 402, and based on map data of the environment received from a map component 210, a driving scene encoder 214 may generate a scene encoding 404 representing the driving environment. In this example, the scene encoding 404 includes a representation of the autonomous vehicle 102, and a number of other agent objects 406-412 perceived based on the sensor data 402 captured by the autonomous vehicle 102. Although the scene encoding 404 is depicted as a top-down representation in this example, it can be understood that in other examples the scene encoding 404 may be represented as an entity-based and/or point-of-view representation from the perspective of the autonomous vehicle 102.

Additionally, although in these examples, the scene encoding 404 (or other environment representation) may be provided as input to the active prediction model 206, in other examples the active prediction model 206 may be configured to receive sets of the trajectories (e.g., a perturbed trajectory of the autonomous vehicle 102, additional agent trajectories, etc.) and need not receive a scene encoding 404 or any other representation of the driving environment.

Figure 4B:
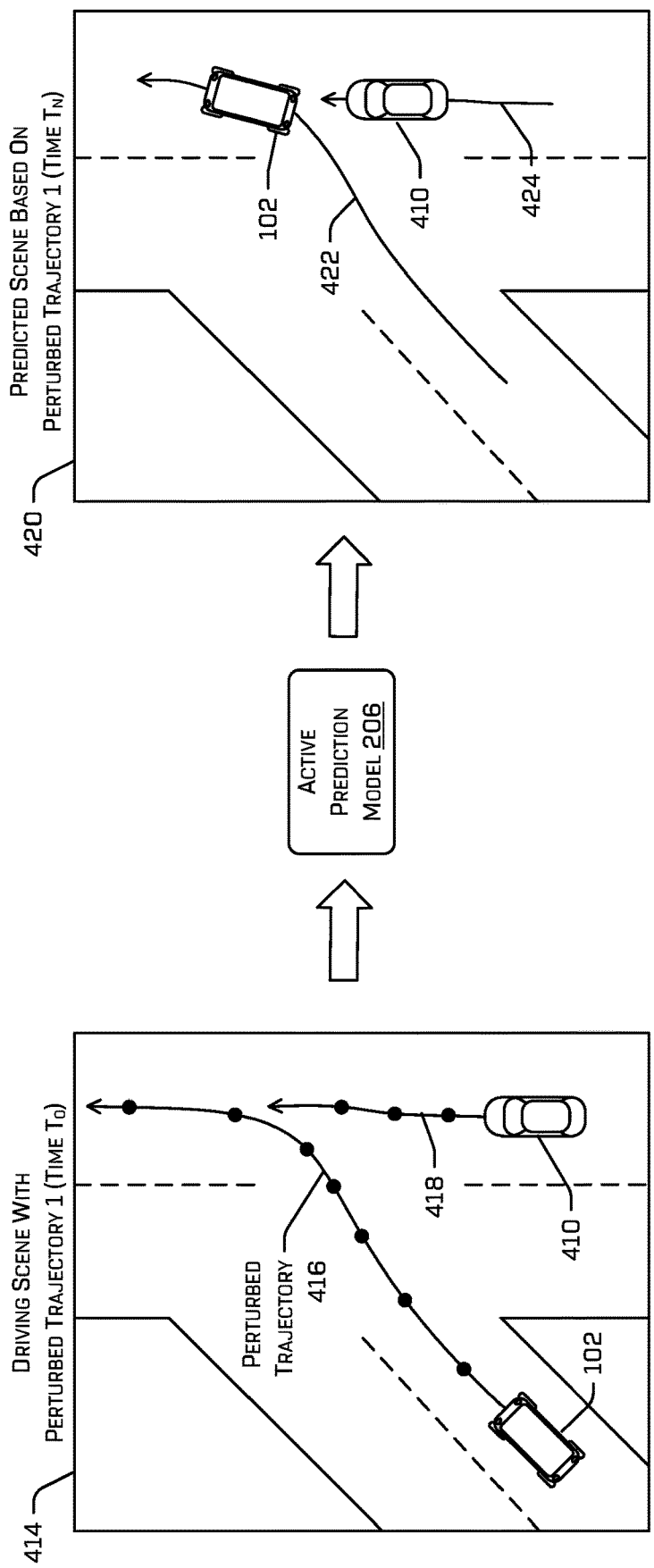

FIG. 4B depicts a first driving scene 414 based on the scene encoding 404, including a first perturbed trajectory 416 for the autonomous vehicle 102, and a trajectory 418 associated with an object 410 (e.g., a vehicle), which is an additional agent in the environment. The first driving scene 414 may represent the same point in time as shown in the driving scene encoding 404, in which the autonomous vehicle 102 is at a start state of a driving route. The perturbed trajectory 416 may be a feasible or infeasible trajectory representing a potential solution for the trajectory optimization problem, and may be determined by the optimization component 202 and/or the perturbed trajectory generator 204 using the techniques described above. The initial trajectory 418 of the object 410 may be determined based on the current state of the object 410 in the driving scene (e.g., position, pose, velocity, steering rate, etc.), and/or may correspond to a previously determined and tracked trajectory of the object 410 at earlier time points in the driving scene. Although this example depicts only the object 410 and the initial trajectory 418 in order not to obscure the features shown in the figure, it can be understood that the planning component 108 may determine an initial driving scene and/or initial trajectories that include any other agents/objects in the environment (e.g., objects 406, 408, and 412).

As shown in this example, the planning component 108 may invoke an active prediction model 206, providing as input to the model the perturbed trajectory 416 (e.g., in the form of a variable vector) and/or a representation of the driving scene at an initial time point. Based on these inputs, the active prediction model 206 may output one or more predicted future trajectories for the autonomous vehicle 102 and/or the additional agents (e.g., object 410), as shown in the predicted driving scene 420. In some examples, the active prediction model 206 may output predicted scene encodings representing the driving scene/environment as a whole, at any number of future time steps or intervals. Additionally or alternatively, the active prediction model 206 may output predicted trajectories for the various objects and need not output an entire predicted driving scene 420. Although this example depicts only the predicted states and trajectories for the autonomous vehicle 102 and object 410, for clarity of the figure, it can be understood that the active prediction model 206 may output predicted trajectories and states for any or all objects in the driving scene.

The predicted driving scene 420 includes predicted updated states and predicted trajectories for the autonomous vehicle 102 and the object 410 at a subsequent time (Tn) in the driving scene. In this example, based on the initial perturbed trajectory 416 used by the autonomous vehicle 102, the active prediction model 206 determined that the autonomous vehicle 102 is likely to follow a trajectory 422 to merge in front of the object 410, and that the object 410 is likely to follow a trajectory 424 to yield and allow the autonomous vehicle 102 to merge. As described above, the trajectory 422 and trajectory 424 output by the active prediction model 206 can be different from the perturbed trajectory 416 and object trajectory 418, based on the reactions and responses of the objects in the environment to the trajectories followed and other movements or actions taken by the other objects in the environment. Based on these predictions (and/or various other predicted trajectories and states from the active prediction model 206, such as predictions at different times before/after Tn, or alternative predictions with different confidences/probabilities, etc.), the cost evaluator 208 may compute costs associated with the perturbed trajectory 416. In this example, the cost evaluator 208 may compute costs for the perturbed trajectory 416 based at least in part on safety scores of the individual predicted trajectories 422 and 424, a passenger comfort score and route progression for the predicted trajectory 422, and/or based on any potential interactions between the predicted trajectories 422 and 424 (e.g., the likelihood of an interaction, the safety/risk level of the interaction, aggression of the interaction, etc.).

Figure 4C:
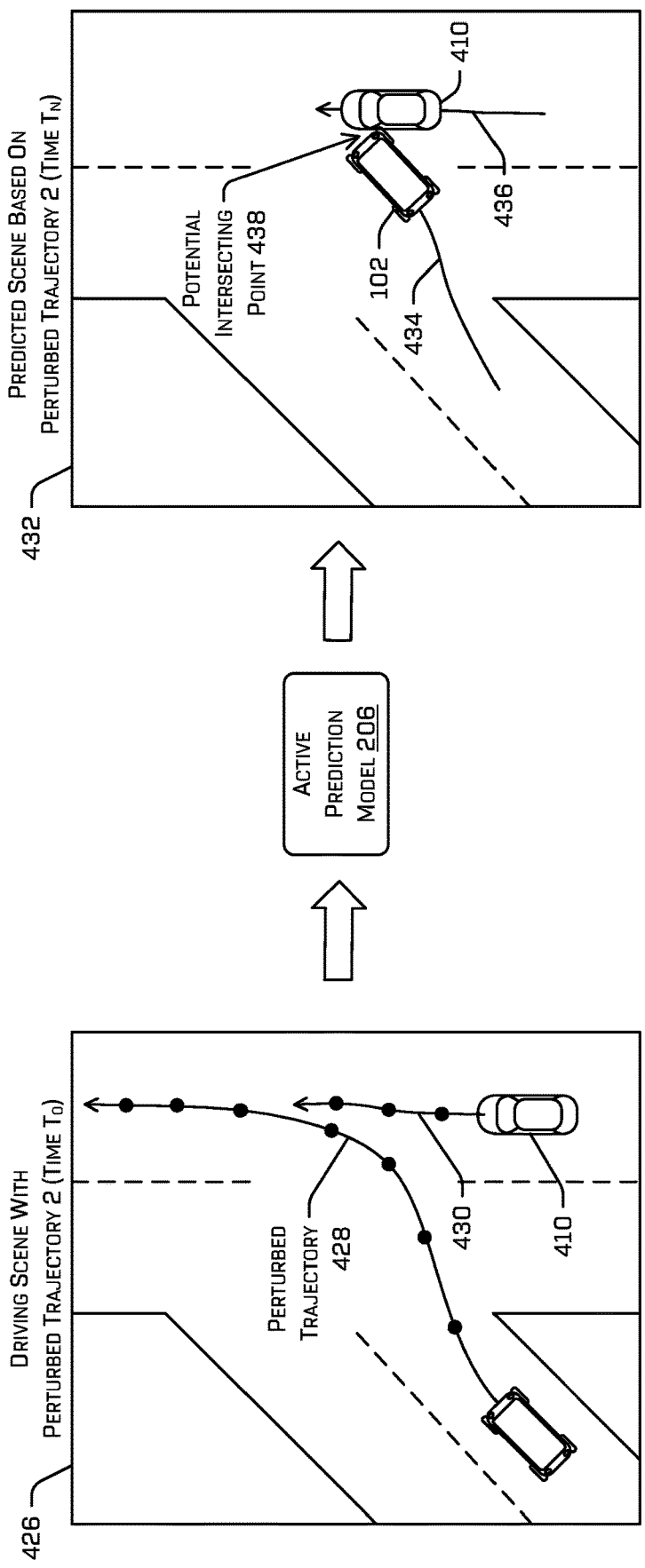

FIG. 4C depicts an alternative second driving scene 426 based on the scene encoding 404, including a second possible perturbed trajectory 428 for the autonomous vehicle 102, and a trajectory 430 associated with the object 410 (which may be the same as trajectory 418). As shown in the above example, the planning component 108 may invoke the active prediction model 206, providing as input to the model the perturbed trajectory 428 and/or a representation of the driving scene at the initial time point. Based on these inputs, the active prediction model 206 may output predicted future trajectories for the autonomous vehicle 102 and the object 410 (and/or any additional agents in the environment), as shown in the predicted driving scene 432.

The predicted driving scene 432 includes predicted updated states and predicted trajectories for the autonomous vehicle 102 and the object 410 at a subsequent time (Tn) in the driving scene, based on the second perturbed trajectory 428 used by the autonomous vehicle 102. In this example, the active prediction model 206 has determined that the autonomous vehicle 102 and the object 410 are likely to follow trajectory 434 and trajectory 436, respectively, in which the autonomous vehicle 102 aggressively merges into the path of the object 410 and a potential collision may result at an intersecting point 438 between the trajectories. Based on these predictions (and/or the various other predicted trajectories and states from the active prediction model 206), the cost evaluator 208 may compute costs associated with the second perturbed trajectory 428. In this example, the cost evaluator 208 may compute costs for the second perturbed trajectory 428 based at least in part on safety scores of the individual predicted trajectories 434 and 436, a passenger comfort score and route progression for the predicted trajectory 434, and/or based on the interaction between the predicted trajectories 434 and 436 (e.g., the likelihood, safety/risk level of the interaction, predicted impact speed, etc.).

Figure 4D:
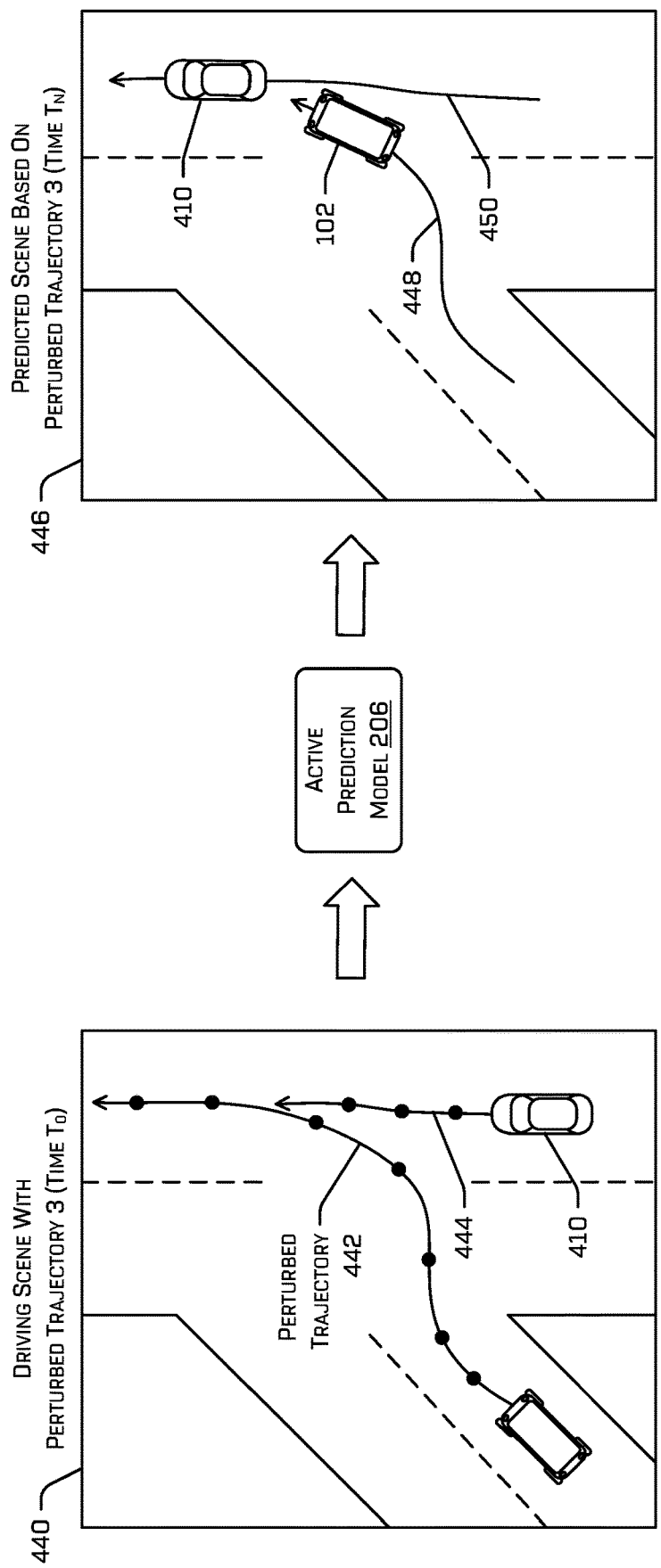

FIG. 4D depicts an alternative third driving scene 440 based on the scene encoding 404, including a third possible perturbed trajectory 442 for the autonomous vehicle 102, and a trajectory 444 associated with the object 410 (which may be the same as trajectory 418). As shown in the above example, the planning component 108 may invoke the active prediction model 206, providing as input to the model the perturbed trajectory 442 and/or a representation of the driving scene at the initial time point. Based on these inputs, the active prediction model 206 may output predicted future trajectories/states for the autonomous vehicle 102 and the object 410 (and/or any additional agents in the environment), as shown in the predicted driving scene 446.

The predicted driving scene 446 includes predicted updated states and predicted trajectories for the autonomous vehicle 102 and the object 410 at a subsequent time (Tn) in the driving scene, based on the third perturbed trajectory 442 used by the autonomous vehicle 102. In this example, the active prediction model 206 has determined that the autonomous vehicle 102 and the object 410 are likely to follow trajectory 448 and trajectory 450, respectively, in which the autonomous vehicle 102 precedes more slowly toward the merging lane, allowing the object 410 to proceed first before merging in behind it. Based on these predictions (and/or the various other predicted trajectories and states from the active prediction model 206), the cost evaluator 208 may compute costs associated with the third perturbed trajectory 442. In this example, the cost evaluator 208 may compute costs for the third perturbed trajectory 442 based at least in part on safety scores of the individual predicted trajectories 448 and 450, a passenger comfort score and route progression for the predicted trajectory 448, and/or based on the interaction between the predicted trajectories 448 and 450 (e.g., the likelihood, safety/risk level of the interaction, predicted impact speed, etc.).

FIG. 5 shows an example table 500 including a number of example cost values associated with various perturbed trajectories. In this example, the cost evaluator 208 may compute cost values associated with three different perturbed trajectories. For some or all of the perturbed trajectories, the active prediction model 206 in this example has determined multiple alternative predictions for the object trajectories/states, each having an associated confidence value. For instance, line 502 includes an example set of cost metrics associated with a first prediction based on a first perturbed trajectory (e.g., perturbed trajectory 416) for the autonomous vehicle 102. Line 504 includes a different example set of cost metrics associated with a second alternative prediction output by the active prediction model 206 based on the first perturbed trajectory. Line 506 includes another example set of cost metrics associated with a first prediction based on a second perturbed trajectory (e.g., perturbed trajectory 428) for the autonomous vehicle 102. Line 508 and line 510 include different example sets of cost metrics associated with different alternative predictions output by the active prediction model 206 based on the second perturbed trajectory. Line 512 includes another example set of cost metrics associated with a prediction based on a third perturbed trajectory (e.g., perturbed trajectory 442) for the autonomous vehicle 102. As described above, when the active prediction model 206 outputs multiple alternative predictions (e.g., predicted trajectories and/or driving scenes) based on a single perturbed trajectory, the cost evaluator 208 may aggregate or combine the cost values for the alternative predictions in various different ways to determine an overall cost associated with the perturbed trajectory. For instance, the alterative sets of cost values may be scaled and/or weighted based on their respective confidence values, etc.

Figure 6:
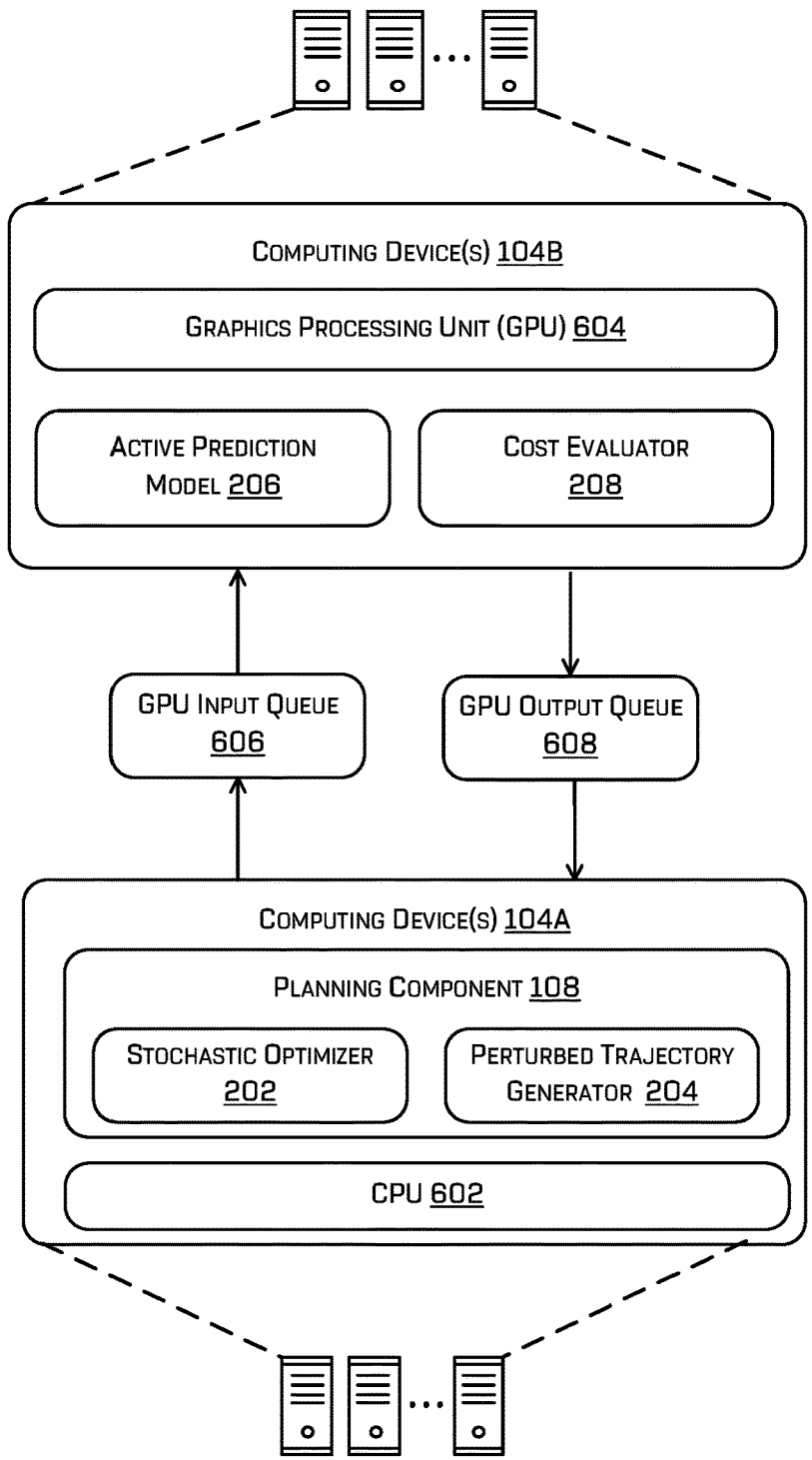
FIG. 6 illustrates an example system including multiple computing devices (e.g., a CPU and a GPU) configured to predict driving scenes and compute costs associated with various perturbed trajectories for an autonomous vehicle, in accordance with one or more examples of the disclosure.

FIG. 6 illustrates an example system 600 including multiple computing devices (e.g., a CPU and a GPU) configured to predict driving scenes and compute costs associated with various perturbed trajectories for an autonomous vehicle. As described above, in some examples, stochastic optimization may scale well with processing via GPUs and/or other similar parallel compute architectures. Accordingly, as shown in this example, an optimization component 202 executing a stochastic optimization technique, and a perturbed trajectory generator 204 may be executed on the CPU, while the compute-heavy active prediction model 206 and cost evaluator 208 may be executed on a GPU.

In this example, computing devices 104A and 104B (which may be referred individually or collectively as computing device(s) 104) may represent computing devices within an autonomous vehicle 102. As described above, the computing device(s) 104 may be configured to determine driving trajectories for the vehicle along designated routes from an initial location toward a destination in a driving environment. In this example, one or more computing device(s) 104A may include a planning component 108 using a CPU 602 to execute the optimization component 202 configured to generate solution sets (or variable sets) based on an optimization algorithm, and the perturbed trajectory generator 204 configured to receive proposed solutions sets from the optimization component 202 and use the variable sets to construct perturbed trajectories.

The perturbed trajectory generator 204 may provide the perturbed trajectories representing potential solutions to the trajectory optimization, to the GPU 604 via the GPU input queue 606. The GPU 604 may execute the active prediction model 206 to determine predicted future object trajectories and/or states based on the perturbed trajectories, and the cost evaluator 208 configured to compute costs associated with the perturbed trajectories based on the future trajectories/states predicted by the active prediction model 206. After using the GPU 604 to model the predicted driving scene and trajectories, and evaluate the associated costs, the computing device(s) 104 may provide the cost data back to the planning component 108 via the GPU output queue 608. Based on the perturbed trajectories determined by the perturbed trajectory generator 204, and the associated cost data received from the GPU 604, the planning component 108 may further use the optimization component 202 to determine subsequent solution sets (e.g., variable perturbations) and/or may compare costs to determine an optimal (e.g., lowest-cost) trajectory from the various perturbed trajectories, which may be selected to control the vehicle in the driving environment.

In various examples, when providing a perturbed trajectory to the GPU input queue 606, the computing device(s) 104 also may place one or more threads/processes related to the subgraph into an inactive state (e.g., sleeping), to be awoken upon receiving an indication that the requested predictions/costs have been computed by the GPU 604. For instance, the computing device(s) 104 may implement one or more GPU/GPU fences and/or GPU/CPU fences to control the flow of evaluated perturbed trajectories within an optimization processing pipeline described herein. In some examples, the planning component 108 may use separate threads to push perturbed trajectory tasks onto the GPU input queue 606, and additional separate threads to pull cost data from the GPU output queue 608. As shown in this example, the computing device(s) 104 may be implemented as separate computing devices 104A and 104B operating within an autonomous vehicle 102. In other examples, one or both of the computing devices 104A and 104B may be implemented in separate computing environments and/or on separate networks. In some implementations, the CPU 602 may be configured to perform separate pre- and post-processing functionalities, such as variable set selection, scheduling, retrieval of cost data from GPU output queues, etc. In these implementations, the computing devices 104 may monitor the speed, performance, capacity, and latencies associated with the respective tasks performed by the CPU 602 and GPU 604, in order to more efficiently manage the real-time determination of robust and optimal driving trajectories for autonomous vehicles.

Figure 7:
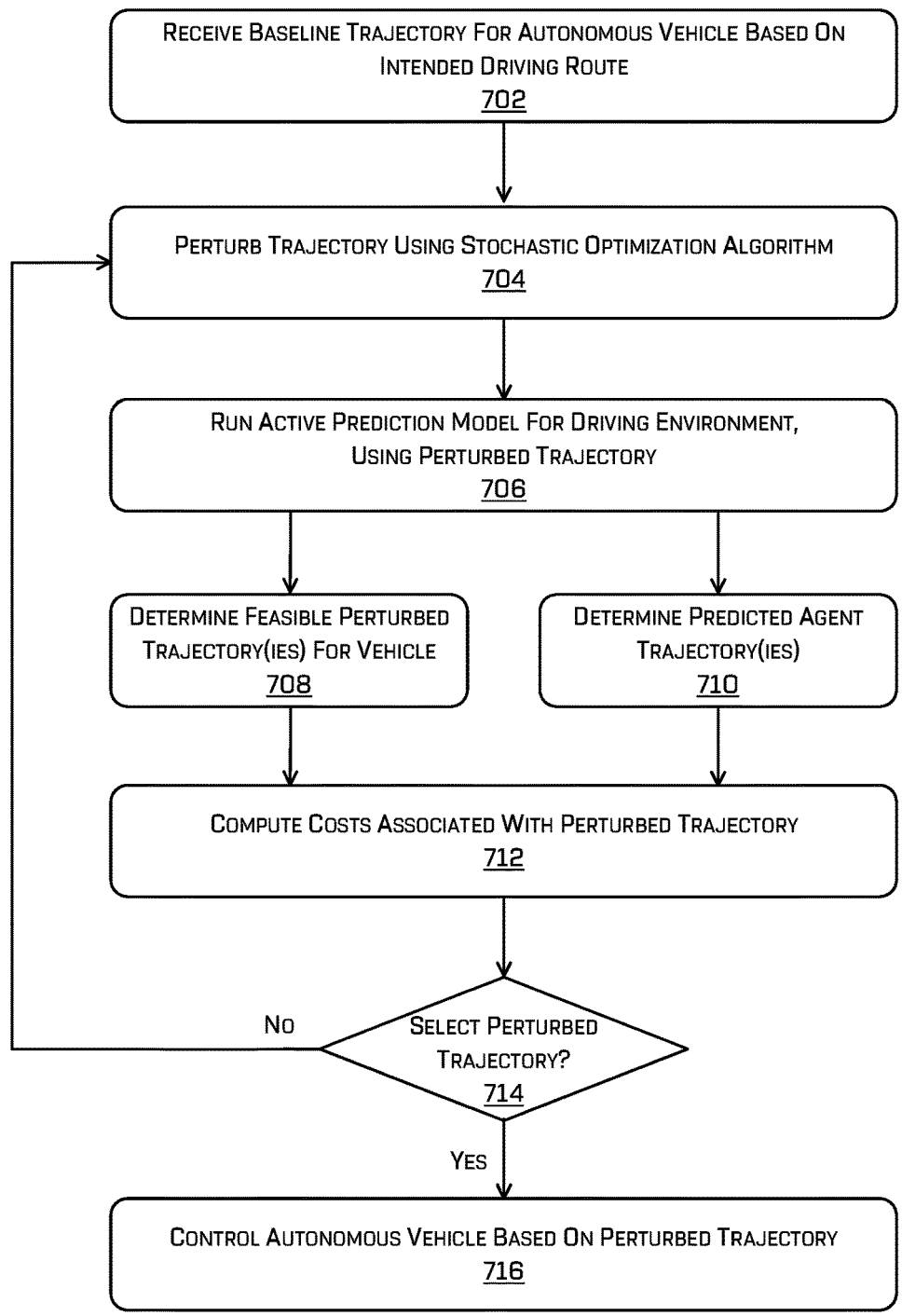
FIG. 7 is a flow diagram illustrating an example technique for determining perturbed trajectories and selecting an optimal trajectory for an autonomous vehicle, in accordance with one or more examples of the disclosure.

FIG. 7 is a flow diagram illustrating an example process 700 for determining perturbed trajectories and selecting an optimal trajectory for an autonomous vehicle. As described herein, the operations of process 700 may be performed by a planning component 108, including various subcomponents and/or by invoking related components, operating within an autonomous vehicle 102.

At operation 702, the planning component 108 may receive (or determine) a baseline trajectory based on an intended driving route. In some examples, the planning component 108 may receive or determine a driving route including a start state and end state. Based on the driving route, a baseline trajectory may be determined representing a simplified and/or non-optimal trajectory. In some examples, the baseline trajectory may follow a center line of the lane and may have a constant velocity. In other examples, a baseline trajectory for the techniques described herein may include an output trajectory from a previous optimization algorithm (e.g., a tree search) which, in at least some examples, may be forward propagated to a current time based on, for example, sensor data.

At operation 704, the planning component 108 may perturb the baseline trajectory using a stochastic optimization algorithm. For example, the optimization component 202 may use a stochastic optimization algorithm to generate a solution set (or variable sets) including a number of parameters (or variables). The perturbed trajectory generator 204 may use the variable set to determine a set of vehicle state parameters (e.g., velocity difference, curvature difference, lateral offset, etc.) relative to the baseline trajectory, and/or to construct a vector representing a perturbed trajectory that may be provided as an input to an active prediction model. Additionally, although this example describes a stochastic algorithm, the optimization component 202 need not perform stochastic optimization techniques, but may use any number of possible optimization algorithms/techniques (e.g., derivative-free least squares (DF-LS), derivative-free constrained optimization (DF-COPT), etc.).

At operation 706, the planning component 108 may execute (or invoke) an active prediction model 206, providing the perturbed trajectory as input to an active prediction model. As described above, the active prediction model 206 may include one or more ML models trained to output, based at least in part on the perturbed trajectory, predictions of future trajectories/states of the autonomous vehicle 102 and/or any additional agents in the driving environment. The active prediction model 206 may receive as input the perturbed trajectory (e.g., in the form of a variable vector) and/or a representation of the driving scene (e.g., a scene encoding) at an initial time point.

At operations 708 and 710, the planning component 108 may determine, via the active prediction model 206, a feasible perturbed trajectory for the autonomous vehicle 102 (operation 708) and predicted agent trajectories for any additional agents in the environment. As described above, in some examples, the planning component 108 may determine the feasible perturbed trajectory before providing the perturbed trajectory (as a feasible trajectory) to the active prediction model 206. In other examples, the planning component 108 may provide the initial perturbed trajectory (which may be feasible or infeasible) to the active prediction model 206, without first performing a conversion or smoothing of the perturbed trajectory. Based on the inputs, the active prediction model 206 may output one or more predicted future trajectories for the autonomous vehicle 102 and/or the additional agents in the environment. In some examples, the active prediction model 206 may output predicted scene encodings representing the driving scene/environment as a whole, at any number of future time steps or intervals. Additionally or alternatively, the active prediction model 206 may output predicted trajectories for the various objects and need not output an entire predicted driving scene. As discussed above, the active prediction model 206 may output a feasible trajectory for the autonomous vehicle in operation 708, that may or may not be the same as the perturbed trajectory provided as input to the active prediction model 206. For instance, if a perturbed trajectory is determined that is initially kino-dynamically infeasible for the autonomous vehicle 102 to perform, the perturbed trajectory generator 204 and/or the active prediction model 206 may be configured to smooth and/or modify the perturbed trajectory in a feasible trajectory. Additionally, the trajectories output by the active prediction model 206 can be different from the perturbed trajectories input into the model, based on predictions of the reactions and responses of the objects in the environment to movements or actions taken by the other objects in the environment.

At operation 712, the planning component 108 may use a cost evaluator 208 to determine the costs associated with the perturbed trajectory that was provided as input to the active prediction model 206. In some examples, the active prediction model 206 may output multiple alternative predictions based on a perturbed trajectory, and the cost evaluator 208 may aggregate or combine the cost values for the alternative predictions in various different ways to determine an overall cost associated with the perturbed trajectory. For instance, the alterative sets of cost values may be scaled and/or weighted based on their respective confidence values, etc. The optimization component 202 may then store and/or compare the costs associated with the proposed solution (e.g., the perturbed trajectory), to determine when to terminate the algorithm and/or when an optimal solution trajectory has been found.

At operation 714, the planning component 108 may determine whether the perturbed trajectory is to be selected as a potential control trajectory to be used by the autonomous vehicle 102 to traverse the driving route. With the optimization component 202 determines that the algorithm should continue and/or that the current perturbed trajectory is not an optimal solution (714:No), then process 700 may return to operation 704 to perturb and evaluate another potential solution selected in accordance with the optimization algorithm. However, when the planning component 108 determines that the perturbed trajectory is an optimal trajectory (e.g., having a lowest cost or a cost below a predetermined cost threshold) (714:Yes), then at operation 716 the planning component 108 may use the perturbed trajectory as a selected trajectory to control the vehicle. For example, controlling the autonomous vehicle 102 based on the selected trajectory may include initiating various system controllers configured to control steering, propulsion, braking, etc., to apply particular vehicle controls (e.g., acceleration controls, braking controls, steering rate changes, etc.) at the particular trajectory points.

Figure 8:
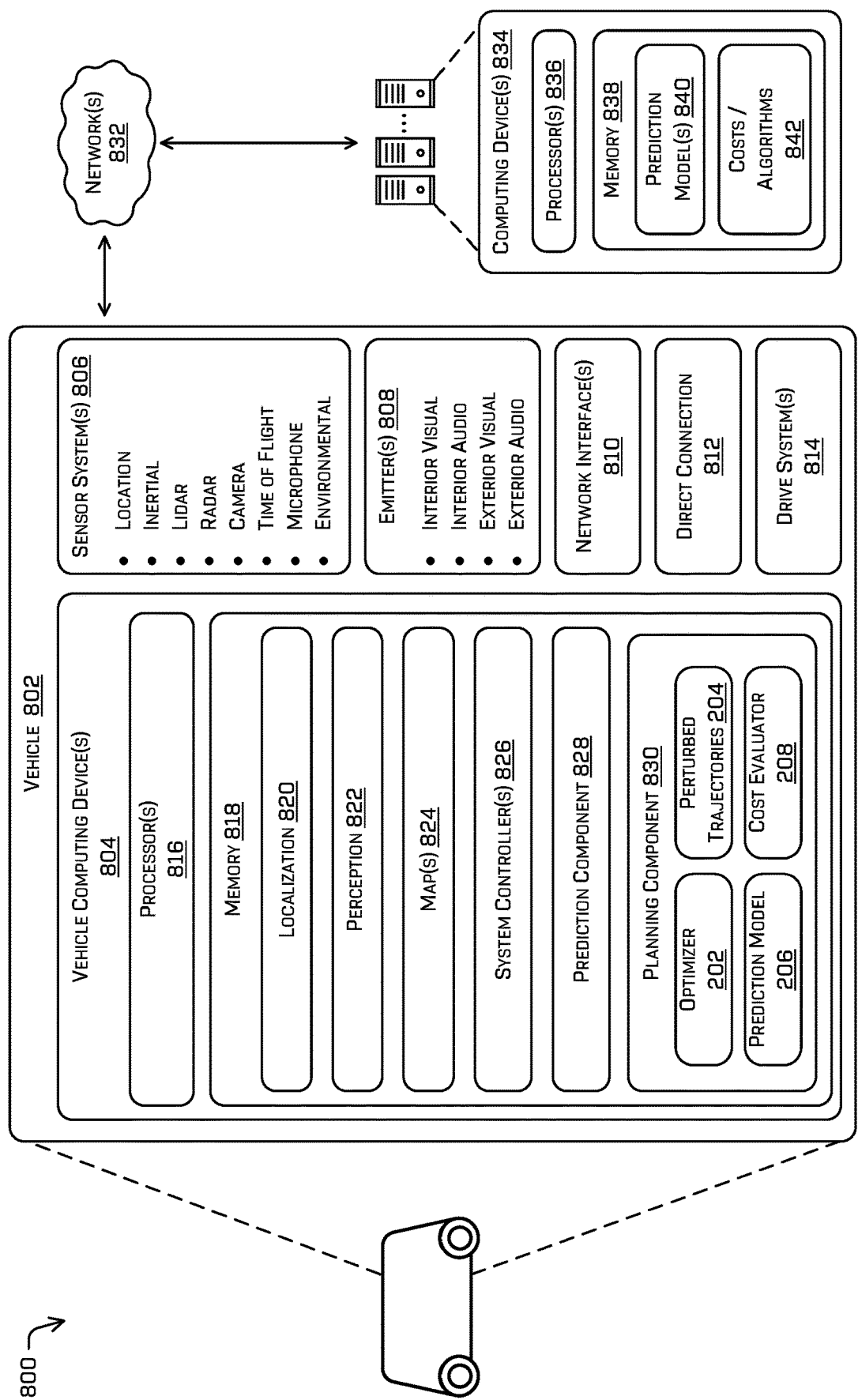
FIG. 8 is a block diagram illustrating an example system, including an autonomous vehicle and separate computing devices, for implementing various techniques described herein.

FIG. 8 is a block diagram of an example system 800 for implementing the techniques described herein. In at least one example, the system 800 may include a vehicle, such as vehicle 802. The vehicle 802 may include one or more vehicle computing devices 804, one or more sensor systems 806, one or more emitters 808, one or more network interfaces 810, at least one direct connection 812, and one or more drive systems 814.

The vehicle computing device 804 may include one or more processors 816 and memory 818 communicatively coupled with the processor(s) 816. In the illustrated example, the vehicle 802 is an autonomous vehicle; however, the vehicle 802 could be any other type of vehicle, such as a semi-autonomous vehicle, or any other system having driving trajectory planning/navigation functionality. For example, the vehicle 802 may be similar or identical to the autonomous vehicle 102 described above. In some instances, the autonomous vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 802 may be a fully or partially autonomous vehicle having any other level or classification.

In the illustrated example, the memory 818 of the vehicle computing device 804 stores a localization component 820, a perception component 822, one or more maps 824 (or map data), one or more system controllers 826, a prediction component 828, and a planning component 830 including an optimization component 202, a perturbed trajectory generator 204, an active prediction model 206, and a cost evaluator 208. Though depicted in FIG. 8 as residing in the memory 818 for illustrative purposes, it is contemplated that the localization component 820, the perception component 822, the maps 824, the system controllers 826, the prediction component 828, the planning component 830, the optimization component 202, the perturbed trajectory generator 204, the active prediction model 206, and/or the cost evaluator 208. may additionally, or alternatively, be accessible to the vehicle 802 (e.g., stored on, or otherwise accessible by, memory remote from the vehicle 802, such as, for example, memory 838 of one or more computing device(s) 834). In some examples, the memory 838 may include one or more prediction model(s) 840, and one or more cost evaluators/algorithms 842.

In at least one example, the localization component 820 may include functionality to receive sensor data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment, such as from map(s) 824, and may continuously determine a location and/or orientation of the vehicle 802 within the environment. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 802. In some instances, the localization component 820 may provide data to various components of the vehicle 802 to determine an initial position of the vehicle 802 for determining the relevance of an object to the vehicle 802, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or a classification of the object as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 818 may further include one or more maps 824 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 802 may be controlled based at least in part on the map(s) 824. That is, the map(s) 824 may be used in connection with the localization component 820, the perception component 822, the prediction component 828, and/or the planning component 830 to determine a location of the vehicle 802, detect objects in an environment, generate routes, determine actions and/or trajectories to navigate within an environment.

In some examples, the one or more maps 824 may be stored on a remote computing device(s) (such as the computing device(s) 834) accessible via network(s) 832. In some examples, multiple maps 824 may be stored based on, for example, a characteristic (e.g., type of entity, time of day, day of week, season of the year, etc.). Storing multiple maps 824 may have similar memory requirements, but increase the speed at which data in a map may be accessed.

In at least one example, the vehicle computing device 804 may include one or more system controllers 826, which may be configured to control steering, propulsion, braking, safety, emitters, communication, and other systems of the vehicle 802. The system controller(s) 826 may communicate with and/or control corresponding systems of the drive system(s) 814 and/or other components of the vehicle 802.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some instances, the prediction component 828 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, prediction component 828 may include the active prediction model 206, described above. The prediction component 828 may generate predicted trajectories of objects (e.g., objects) in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior.

The planning component 830 may include various components and functionalities similar or identical to those of the planning component 108, described above. As discussed above, the planning component 830 may determine a trajectory for the vehicle 802 to follow to traverse through an environment. In various examples, the planning component 830 may determine various routes and trajectories and various levels of detail. For example, the planning component 830 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 830 may generate an instruction for guiding the vehicle 802 along at least a portion of the route from the first location to the second location. In at least one example, the planning component 830 may determine how to guide the vehicle 802 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single trajectory of the multiple trajectories in a receding data horizon having the highest confidence level may be selected to operate the vehicle. In various examples, the planning component 830 may select a trajectory for the vehicle 802.

In other examples, the planning component 830 may alternatively, or additionally, use data from the localization component 820, the perception component 822, map(s) 824, and/or the prediction component 828 to determine a trajectory for the vehicle 802 to follow to traverse through an environment. For example, the planning component 830 may receive data (e.g., object data) from the localization component 820, the perception component 822, and/or the prediction component 828 regarding objects associated with an environment. In some examples, the planning component 830 receives data for relevant objects within the environment. Using this data, the planning component 830 may determine a route to travel from a first location (e.g., a current location) to a second location (e.g., a target location) to avoid objects in an environment. In at least some examples, such a planning component 830 may determine there is no such collision-free trajectory and, in turn, provide a trajectory that brings vehicle 802 to a safe stop avoiding all collisions and/or otherwise mitigating damage.

In some instances, aspects of some or all of the components discussed herein may include any models, techniques, and/or machine learned techniques. For example, in some instances, the components in the memory 818 (and the memory 838, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device 804. Additionally, or in the alternative, the sensor system(s) 806 may send sensor data, via the one or more networks 832, to the one or more computing device(s) 834 at a particular frequency, after a lapse of a predetermined period of time, in near real-time, etc.

The vehicle 802 may also include one or more emitters 808 for emitting light and/or sound. The emitter(s) 808 may include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 may also include one or more network interfaces 810 (or communication connections) that enable communication between the vehicle 802 and one or more other local or remote computing device(s). For instance, the network interfaces 810 may facilitate communication with other local computing device(s) on the vehicle 802 and/or the drive system(s) 814. Also, the network interface(s) 810 may allow the vehicle to communicate with other nearby computing device(s) (e.g., computing device(s) 834, other nearby vehicles, etc.) and/or one or more remote sensor system(s) for receiving sensor data. The network interface(s)

810 also may enable the vehicle 802 to communicate with a remote teleoperations computing device or other remote services.

The network interface(s) 810 may include physical and/or logical interfaces for connecting the vehicle computing device 804 to another computing device or a network, such as network(s) 832. For example, the network interface(s) 810 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 may include one or more drive systems 814. In some examples, the vehicle 802 may have a single drive system 814. In at least one example, if the vehicle 802 has multiple drive systems 814, individual drive systems 814 may be positioned on opposite ends of the vehicle 802 (e.g., the front and the rear, etc.). In at least one example, the drive system(s) 814 may include one or more sensor systems to detect conditions of the drive system(s) 814 and/or the surroundings of the vehicle 802. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 814. In some cases, the sensor system(s) on the drive system(s) 814 may overlap or supplement corresponding systems of the vehicle 802 (e.g., sensor system(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 814. Furthermore, the drive system(s) 814 may also include one or more communication connection(s) that enable communication by the respective drive module with one or more other local or remote computing device(s).

In at least one example, the direct connection 812 may provide a physical interface to couple the one or more drive system(s) 814 with the body of the vehicle 802. For example, the direct connection 812 may allow the transfer of energy, fluids, air, data, etc. between the drive system(s) 814 and the vehicle. In some instances, the direct connection 812 may further releasably secure the drive system(s) 814 to the body of the vehicle 802.

In at least one example, the localization component 820, the perception component 822, the maps 824, the system controllers 826, the prediction component 828, the planning component 830, the optimization component 202, the perturbed trajectory generator 204, the active prediction model 206, and/or the cost evaluator 208 may process sensor data, as described above, and may send their respective outputs, over the one or more network(s) 832, to the computing device(s) 834. In at least one example, the localization component 820, the perception component 822, the maps 824, the system controllers 826, the prediction component 828, the planning component 830, the optimization component 202, the perturbed trajectory generator 204, the active prediction model 206, and/or the cost evaluator 208 may send their respective outputs to the computing device(s) 834 at a particular frequency, after a lapse of a predetermined period of time, in near real-time, etc.

In some examples, the vehicle 802 may send sensor data to the computing device(s) 834 via the network(s) 832. In some examples, the vehicle 802 may receive sensor data from the computing device(s) 834 and/or remote sensor system(s) via the network(s) 832. The sensor data may include raw sensor data and/or processed sensor data and/or representations of sensor data. In some examples, the sensor data (raw or processed) may be sent and/or received as one or more log files.

The computing device(s) 834 may include processor(s) 836 and a memory 838, which may include one or more prediction model(s) 840, and/or one or more cost evaluators/algorithms 842. In some examples, computing device(s) 834 may store various prediction model(s) 840 and/or cost evaluators/algorithms 842, which may be associated with various different models of autonomous vehicles (e.g., having different capabilities and kino-dynamically feasible trajectories), different driving environments (e.g., regions, driving scene types, etc.), and/or different driving conditions (e.g., traffic conditions, road conditions, weather conditions, etc.). In such examples, the computing device(s) 834 may be configured to provide various combinations of optimizer (or optimization algorithm) components, perturbed trajectory generator components, one or more prediction model(s), and/or cost evaluator component(s) to various different vehicles (e.g., 802), depending on the type, model, features, current driving environment, current driving conditions, etc., of the vehicles. Additionally, in some examples, the memory 838 may store one or more of components that are similar to the component(s) stored in the memory 818 of the vehicle 802. In such examples, the computing device(s) 834 may be configured to perform one or more of the processes described herein with respect to the vehicle 802.

The processor(s) 816 of the vehicle 802 and the processor(s) 836 of the computing device(s) 834 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and memory 838 are examples of non-transitory computer-readable media. The memory 818 and memory 838 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 8 is illustrated as a distributed system, in alternative examples, components of the vehicle 802 may be associated with the computing device(s) 834 and/or components of the computing device(s) 834 may be associated with the vehicle 802. That is, the vehicle 802 may perform one or more of the functions associated with the computing device(s) 834, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A. A vehicle comprising: one or more processors; and one or more non-transitory computer-readable media storing computer-executable instructions that, when executed, cause the one or more processors to perform operations comprising: receiving a trajectory associated with controlling the vehicle in an environment; segmenting, based at least in part on one or more of a time period or a length, the trajectory into a plurality of segments; determining, for a segment of the plurality of segments, a vector representative of a vehicle state value associated with the segment; perturbing the vector into a perturbed vector, the perturbed vector representing a portion of a perturbed trajectory associated with the vehicle; determining, based at least in part on the perturbed trajectory, a kino-dynamically feasible perturbed trajectory for the vehicle; inputting the kino-dynamically feasible perturbed trajectory and a representation of the environment into a machine learned model into a machine learned model; receiving, from the machine learned model, a predicted object trajectory for an object in the environment; determining, based at least in part on the kino-dynamically feasible perturbed trajectory for the vehicle and the predicted object trajectory, a cost associated with the kino-dynamically feasible perturbed trajectory; determining the kino-dynamically feasible perturbed trajectory as a control trajectory for the vehicle, based at least in part on the cost; and controlling the vehicle in the environment, based at least in part on the control trajectory.

B. The vehicle of paragraph A, wherein perturbing the vector comprises: perturbing a velocity value associated with the vector; and perturbing a lateral position value associated with the vector.

C. The vehicle of paragraph A, wherein the perturbed trajectory is a kino-dynamically infeasible trajectory for the vehicle, and wherein determining the kino-dynamically feasible perturbed trajectory comprises: determining that a driving maneuver associated with the perturbed trajectory is kino-dynamically infeasible for the vehicle; and modifying a parameter of the perturbed vector associated with the driving maneuver such that the modified perturbed vector results in a kino-dynamically feasible trajectory.

D. The vehicle of paragraph A, wherein: perturbing the vector is performed by a first process executing on a central processing unit (CPU) of the vehicle; and executing the machine-learned model is performed by a second process executing on a graphics processing unit (GPU) of the vehicle.

E. The vehicle of paragraph A, wherein determining the cost associated with the perturbed vector comprises determining at least one of: a safety cost associated with the perturbed vector; a route progress cost associated with the perturbed vector; or a comfort cost associated with the perturbed vector.

F. A method comprising: receiving a trajectory associated with operation of a vehicle in an environment; perturbing the trajectory, into a perturbed trajectory; determining, based at least in part on the perturbed trajectory and a representation of the environment: a kino-dynamically feasible trajectory for the vehicle, associated with the perturbed trajectory; and a predicted object trajectory for an object in the environment; determining, based at least in part on the kino-dynamically feasible trajectory for the vehicle and the predicted object trajectory, a cost associated with the perturbed trajectory; determining the perturbed trajectory as a parameterized control trajectory for the vehicle, based at least in part on the cost; and controlling the vehicle in the environment, based at least in part on the parameterized control trajectory.

G. The method of paragraph F, wherein perturbing the trajectory comprises: segmenting, based at least in part on one or more of a time period or a length, the trajectory into a plurality of segments; associating a vehicle state value associated with a segment of the plurality of states with a vector; and perturbing the vector.

H. The method of paragraph G, wherein the vector comprises an indication of a lateral offset from the trajectory and a velocity offset from the trajectory.

I. The method of paragraph F, wherein determining the kino-dynamically feasible trajectory for the vehicle and the predicted object trajectory for the object comprises: executing a machine-learned model trained to generate, based at least in part on the perturbed trajectory and the representation of the environment, a predicted future representation of the environment.

J. The method of paragraph I, wherein: perturbing the trajectory is performed by a first process executing on a central processing unit (CPU) of the vehicle; and executing the machine-learned model is performed by a second process executing on a graphics processing unit (GPU) of the vehicle.

K. The method of paragraph F, wherein perturbing the trajectory comprises: determining, using a stochastic optimization algorithm, a perturbation for a parameter of the trajectory.

L. The method of paragraph F, wherein: the trajectory comprises a baseline trajectory including, for a first trajectory point, a first lateral offset parameter representing a center point in a road segment and a second velocity parameter representing a predetermined velocity based on the speed limit associated with the road segment; and determining the perturbed trajectory comprises perturbing at least one of the first lateral offset parameter or the second velocity parameter, based at least in part on a perturbation parameter determined by an optimization algorithm.

M. The method of paragraph F, wherein determining the cost associated with the perturbed trajectory comprises determining at least one of: a safety cost associated with the perturbed trajectory; a route progress cost associated with the perturbed trajectory; or a comfort cost associated with the perturbed trajectory.

N. The method of paragraph F, wherein determining the perturbed trajectory as a parameterized control trajectory comprises: determining a second perturbed trajectory, based on at least in part on a second perturbation to the trajectory; determining a second cost associated with the second perturbed trajectory; and determining the perturbed trajectory as a parameterized control trajectory, based at least in part on comparing the cost and the second cost.

O. One or more non transitory computer readable media storing instructions executable by a processor, wherein the instructions, when executed, cause the processor to perform operations comprising: receiving a trajectory associated with operation of a vehicle in an environment; perturbing the trajectory, into a perturbed trajectory; determining, based at least in part on the perturbed trajectory and a representation of the environment: a kino-dynamically feasible trajectory for the vehicle, associated with the perturbed trajectory; and a predicted object trajectory for an object in the environment; determining, based at least in part on the kino-dynamically feasible trajectory for the vehicle and the predicted object trajectory, a cost associated with the perturbed trajectory; determining the perturbed trajectory as a parameterized control trajectory for the vehicle, based at least in part on the cost; and controlling the vehicle in the environment, based at least in part on the parameterized control trajectory.

P. The one or more non transitory computer readable media of paragraph O, wherein perturbing the trajectory comprises: segmenting, based at least in part on one or more of a time period or a length, the trajectory into a plurality of segments; associating a vehicle state value associated with a segment of the plurality of states with a vector; and perturbing the vector.

Q. The one or more non transitory computer readable media of paragraph O, wherein the vector comprises an indication of a lateral offset from the trajectory and a velocity offset from the trajectory.

R. The one or more non transitory computer readable media of paragraph O, wherein determining the kino-dynamically feasible trajectory for the vehicle and the predicted object trajectory for the object comprises: executing a machine-learned model trained to generate, based at least in part on the perturbed trajectory and the representation of the environment, a predicted future representation of the environment.

S. The one or more non transitory computer readable media of paragraph R, wherein: perturbing the trajectory is performed by a first process executing on a central processing unit (CPU) of the vehicle; and executing the machine-learned model is performed by a second process executing on a graphics processing unit (GPU) of the vehicle.

T. The one or more non transitory computer readable media of paragraph O, wherein: the trajectory comprises a baseline trajectory including, for a first trajectory point, a first lateral offset parameter representing a center point in a road segment and a second velocity parameter representing a predetermined velocity based on the speed limit associated with the road segment; and determining the perturbed trajectory comprises perturbing at least one of the first lateral offset parameter or the second velocity parameter, based at least in part on a perturbation parameter determined by an optimization algorithm.

While the example clauses described above are described with respect to particular implementations, it should be understood that, in the context of this document, the content of the example clauses can be implemented via a method, device, system, a computer-readable medium, and/or another implementation. Additionally, any of the examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
   one or more processors; and
   one or more non-transitory computer-readable media storing computer-executable instructions that, when executed, cause the one or more processors to perform operations comprising:
   receiving a vehicle trajectory associated with controlling the vehicle in an environment including the vehicle and a dynamic object different from the vehicle, wherein the vehicle trajectory comprises a plurality of trajectory points;
   determining, for a trajectory point of the plurality of trajectory points, vector representative of a vehicle state value associated with the trajectory point;
   perturbing the vector into a perturbed vector, the perturbed vector representing a portion of a perturbed vehicle trajectory associated with the vehicle;
   determining, based at least in part on the perturbed vehicle trajectory, a kino-dynamically feasible perturbed trajectory for the vehicle;
   inputting the kino-dynamically feasible perturbed trajectory and a representation of the environment into a machine-learned model;
   receiving, from the machine-learned model, a predicted object trajectory for the dynamic object;
   determining, based at least in part on the kino-dynamically feasible perturbed trajectory for the vehicle and the predicted object trajectory, a cost associated with the kino-dynamically feasible perturbed trajectory;
   determining the kino-dynamically feasible perturbed trajectory as a control trajectory for the vehicle, based at least in part on the cost; and
   controlling the vehicle in the environment, based at least in part on the control trajectory.

2. The vehicle of claim 1, wherein perturbing the vector comprises:
   perturbing a velocity value associated with the vector; and
   perturbing a lateral position value associated with the vector.

3. The vehicle of claim 1, wherein the perturbed vehicle trajectory is a kino-dynamically infeasible trajectory for the vehicle, and wherein determining the kino-dynamically feasible perturbed trajectory comprises:
   determining that a driving maneuver associated with the perturbed vehicle trajectory is kino-dynamically infeasible for the vehicle; and
   modifying a parameter of the perturbed vector associated with the driving maneuver such that the modified perturbed vector results in a kino-dynamically feasible trajectory.

4. The vehicle of claim 1, wherein:
   perturbing the vector is performed by a first process executing on a central processing unit (CPU) of the vehicle; and
   executing the machine-learned model is performed by a second process executing on a graphics processing unit (GPU) of the vehicle.

5. The vehicle of claim 1, wherein determining the cost associated with the perturbed vector comprises determining at least one of:
   a safety cost associated with the perturbed vector;
   a route progress cost associated with the perturbed vector; or
   a comfort cost associated with the perturbed vector.

6. A method comprising:
   receiving a vehicle trajectory associated with operation of a vehicle in an environment including the vehicle and a dynamic object different from the vehicle, wherein the vehicle trajectory comprises a sequence of trajectory points;

perturbing the vehicle trajectory, into a perturbed vehicle trajectory, by perturbing a trajectory point of the sequence of trajectory points;

determining a kino-dynamically feasible perturbed trajectory for the vehicle, associated with the perturbed vehicle trajectory;

determining, based at least in part on the kino-dynamically feasible perturbed trajectory for the vehicle, a predicted object trajectory for the dynamic object;

determining, based at least in part on the kino-dynamically feasible perturbed trajectory for the vehicle and the predicted object trajectory, a cost associated with the perturbed vehicle trajectory;

determining the perturbed vehicle trajectory as a parameterized control trajectory for the vehicle, based at least in part on the cost; and controlling the vehicle in the environment, based at least in part on the parameterized control trajectory.

7. The method of claim 6, wherein perturbing the vehicle trajectory comprises:

segmenting, based at least in part on one or more of a time period or a length, the vehicle trajectory into a plurality of segments, wherein each segment of the plurality of segments is associated with a trajectory point of the sequence of trajectory points;

determining a vector based at least in part on a vehicle state value associated with a segment of the plurality of segments; and perturbing the vector.

8. The method of claim 7, wherein the vector comprises an indication of a lateral offset from the vehicle trajectory and a velocity offset from the vehicle trajectory.

9. The method of claim 6, wherein determining the kino-dynamically feasible perturbed trajectory for the vehicle and the predicted object trajectory for the dynamic object comprises:

executing a machine-learned model trained to generate, based at least in part on the perturbed vehicle trajectory and a representation of the environment, a predicted future representation of the environment.

10. The method of claim 9, wherein:

perturbing the vehicle trajectory is performed by a first process executing on a central processing unit (CPU) of the vehicle; and executing the machine-learned model is performed by a second process executing on a graphics processing unit (GPU) of the vehicle.

11. The method of claim 6, wherein perturbing the vehicle trajectory comprises:

determining, using a stochastic optimization algorithm, a perturbation for a parameter of the vehicle trajectory.

12. The method of claim 6, wherein:

the vehicle trajectory comprises a baseline trajectory including, for a first trajectory point, a first lateral offset parameter representing a center point in a road segment and a second velocity parameter representing a predetermined velocity based on a speed limit associated with the road segment; and determining the perturbed vehicle trajectory comprises perturbing at least one of the first lateral offset parameter or the second velocity parameter, based at least in part on a perturbation parameter determined by an optimization algorithm.

13. The method of claim 6, wherein determining the cost associated with the perturbed vehicle trajectory comprises determining at least one of:

a safety cost associated with the perturbed vehicle trajectory;

a route progress cost associated with the perturbed vehicle trajectory; or a comfort cost associated with the perturbed vehicle trajectory.

14. The method of claim 6, wherein determining the perturbed vehicle trajectory as a parameterized control trajectory comprises:

determining a second perturbed vehicle trajectory, based on at least in part on a second perturbation to the vehicle trajectory;

determining a second cost associated with the second perturbed vehicle trajectory; and determining the perturbed vehicle trajectory as a parameterized control trajectory, based at least in part on comparing the cost and the second cost.

15. One or more non-transitory computer-readable media storing instructions executable by a processor, wherein the instructions, when executed, cause the processor to perform operations comprising:

receiving a vehicle trajectory associated with operation of a vehicle in an environment including the vehicle and a dynamic object different from the vehicle, wherein the vehicle trajectory comprises a sequence of trajectory points;

perturbing the vehicle trajectory, into a perturbed vehicle trajectory, by perturbing a trajectory point of the sequence of trajectory points;

determining a kino-dynamically feasible perturbed trajectory for the vehicle, associated with the perturbed vehicle trajectory;

determining, based at least in part on the kino-dynamically feasible perturbed trajectory for the vehicle, a predicted object trajectory for the dynamic object;

determining, based at least in part on the kino-dynamically feasible perturbed trajectory for the vehicle and the predicted object trajectory, a cost associated with the perturbed vehicle trajectory;

determining the perturbed vehicle trajectory as a parameterized control trajectory for the vehicle, based at least in part on the cost; and controlling the vehicle in the environment, based at least in part on the parameterized control trajectory.

16. The one or more non-transitory computer-readable media of claim 15, wherein perturbing the vehicle trajectory comprises:

segmenting, based at least in part on one or more of a time period or a length, the vehicle trajectory into a plurality of segments, wherein each segment of the plurality of segments is associated with a trajectory point of the sequence of trajectory points;

determining a vector based at least in part on a vehicle state value associated with a segment of the plurality of segments; and perturbing the vector.

17. The one or more non-transitory computer-readable media of claim 16, wherein the vector comprises an indication of a lateral offset from the vehicle trajectory and a velocity offset from the vehicle trajectory.

18. The one or more non-transitory computer-readable media of claim 15, wherein determining the kino-dynamically feasible perturbed trajectory for the vehicle and the predicted object trajectory for the dynamic object comprises:

executing a machine-learned model trained to generate, based at least in part on the perturbed vehicle trajectory and a representation of the environment, a predicted future representation of the environment.

19. The one or more non-transitory computer-readable media of claim 18, wherein:
perturbing the vehicle trajectory is performed by a first process executing on a central processing unit (CPU) of the vehicle; and
executing the machine-learned model is performed by a second process executing on a graphics processing unit (GPU) of the vehicle.

20. The one or more non-transitory computer-readable media of claim 15, wherein:
the vehicle trajectory comprises a baseline trajectory including, for a first trajectory point, a first lateral offset parameter representing a center point in a road segment and a second velocity parameter representing a predetermined velocity based on a speed limit associated with the road segment; and
determining the perturbed vehicle trajectory comprises perturbing at least one of the first lateral offset parameter or the second velocity parameter, based at least in part on a perturbation parameter determined by an optimization algorithm.

* * * * *